United States Patent
Jönsson

(10) Patent No.: US 10,148,895 B2
(45) Date of Patent: Dec. 4, 2018

(54) GENERATING A COMBINED INFRARED/VISIBLE LIGHT IMAGE HAVING AN ENHANCED TRANSITION BETWEEN DIFFERENT TYPES OF IMAGE INFORMATION

(71) Applicant: FLIR Systems AB, Täby (SE)

(72) Inventor: Henrik Jönsson, Stockholm (SE)

(73) Assignee: FLIR SYSTEMS AB, Taby (SE)

( * ) Notice: Subject to any disclaimer, the term of this patent is extended or adjusted under 35 U.S.C. 154(b) by 602 days.

(21) Appl. No.: 14/578,256

(22) Filed: Dec. 19, 2014

(65) Prior Publication Data
US 2015/0189192 A1 Jul. 2, 2015

Related U.S. Application Data

(60) Provisional application No. 61/918,467, filed on Dec. 19, 2013.

(51) Int. Cl.
*H04N 5/33* (2006.01)
*H04N 5/265* (2006.01)
(Continued)

(52) U.S. Cl.
CPC ............ *H04N 5/265* (2013.01); *G06T 5/50* (2013.01); *H04N 5/2258* (2013.01);
(Continued)

(58) Field of Classification Search
CPC ................ H04N 5/33; G06T 2207/20192
See application file for complete search history.

(56) References Cited

U.S. PATENT DOCUMENTS

| 8,755,597 B1* | 6/2014 | Tantalo ............... G06K 9/2018 382/162 |
| 2005/0270425 A1* | 12/2005 | Min .................... H04N 5/142 348/606 |

(Continued)

FOREIGN PATENT DOCUMENTS

CN          1545064 A  *  11/2004

OTHER PUBLICATIONS

Barnes, C. (Sep. 2013). Blending and Compositing. Retrieved from http://www.connellybarnes.com/work/class/2013/cs6501/05_blending.pptx (Year: 2013).*

*Primary Examiner* — Tat C Chio
*Assistant Examiner* — Fabio S Lima
(74) *Attorney, Agent, or Firm* — Haynes and Boone, LLP

(57) ABSTRACT

There is provided a method and an arrangement for generating a combined image having an enhanced transition between image areas each representing a different type of image information. The method may include: determining a set of pixel coordinates, wherein the set of pixel coordinates partly overlaps at least one area in the combined image wherein the pixel values represent image information according to a first type of image information; and/or wherein the set of coordinates partly overlaps at least another area in the combined image wherein the pixel values represent image information according to a second type of image information, dependent on a selection rule; and generating a new combined image by assigning pixel values to the pixels having coordinates comprised in the determined set of pixel coordinates dependent on a mixing rule and the pixel values of the corresponding coordinates of the combined image.

18 Claims, 14 Drawing Sheets
(3 of 14 Drawing Sheet(s) Filed in Color)

(51) Int. Cl.
*G06T 5/50* (2006.01)
*H04N 5/225* (2006.01)
*H04N 5/262* (2006.01)

(52) U.S. Cl.
CPC ........... *H04N 5/2622* (2013.01); *H04N 5/332* (2013.01); *G06T 2207/10024* (2013.01); *G06T 2207/10052* (2013.01); *G06T 2207/20221* (2013.01); *H04N 5/33* (2013.01)

(56) References Cited

U.S. PATENT DOCUMENTS

| | | | | |
|---|---|---|---|---|
| 2008/0099678 A1* | 5/2008 | Johnson | ................ | G01J 5/02 250/332 |
| 2010/0166337 A1* | 7/2010 | Murashita | ............ | H04N 5/262 382/284 |
| 2011/0001809 A1* | 1/2011 | McManus | ............... | G01J 5/02 348/61 |

* cited by examiner

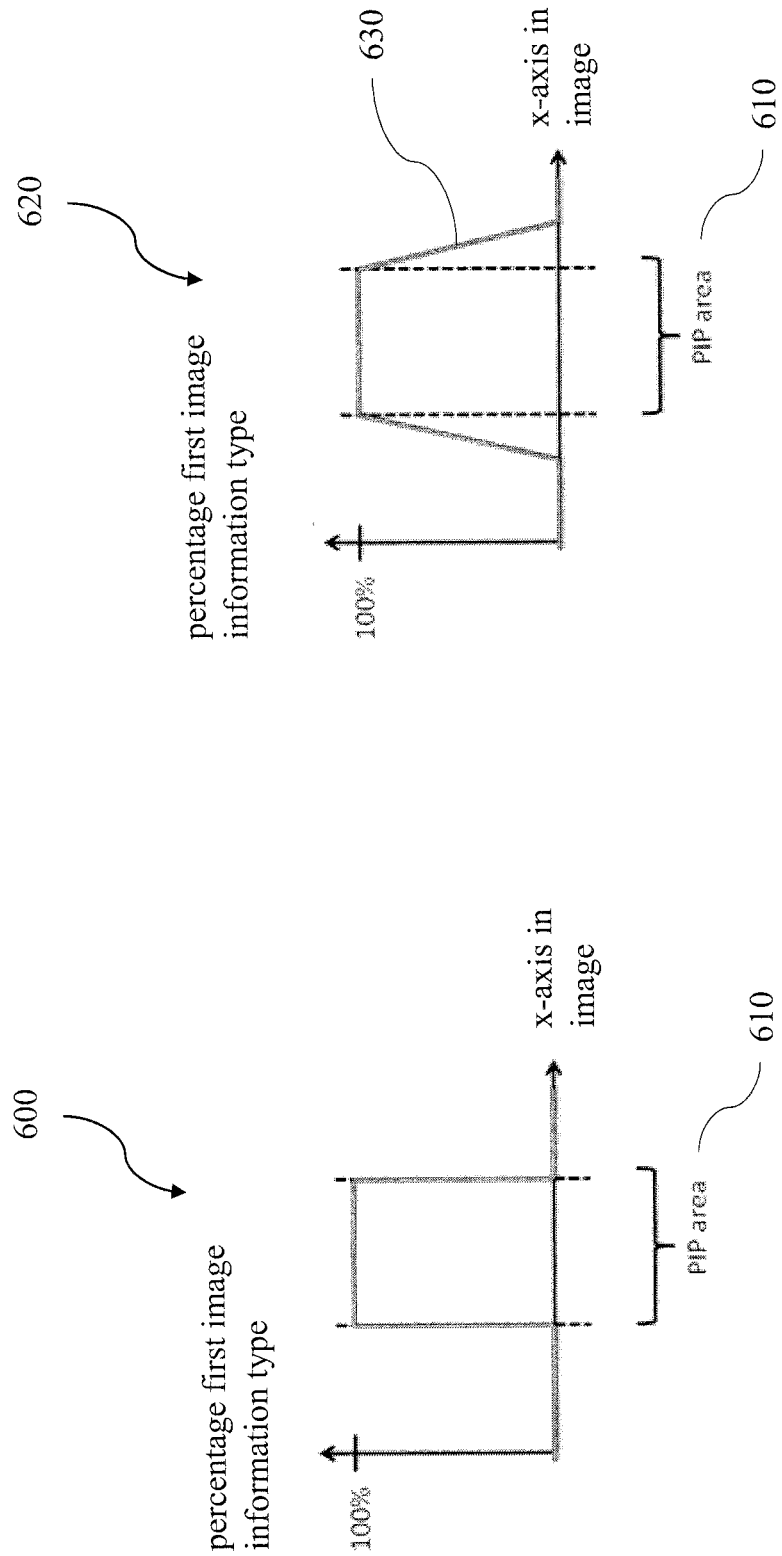

GENERATING A COMBINED INFRARED/VISIBLE LIGHT IMAGE HAVING AN ENHANCED TRANSITION BETWEEN DIFFERENT TYPES OF IMAGE INFORMATION

CROSS-REFERENCE TO RELATED APPLICATIONS

This application claims priority to and the benefit of U.S. Provisional Patent Application No. 61/918,467 filed Dec. 19, 2013 and entitled "GENERATING A COMBINED INFRARED/VISIBLE LIGHT IMAGE HAVING AN ENHANCED TRANSITION BETWEEN DIFFERENT TYPES OF IMAGE INFORMATION," which is hereby incorporated by reference in its entirety.

TECHNICAL FIELD

Generally, embodiments of the invention relate to the technical field of performing image processing on a combined IR/VL image to obtain enhanced visual transitions between areas in the combined image that represent different types of image information.

More specifically, various embodiments relate to changing the pixel values of pixels that are determined to be part of a transition area according to a mixing rule to obtain a combined image with improved visual appearance and further improved interpretability.

BACKGROUND

IR images, sometimes referred to as thermal images if the IR radiation information on which the image is based is within the thermal spectrum, of systems that include electrical and mechanical devices and structures are useful for monitoring and analyzing the performance thereof, both during design and development for design optimization purposes, and during operational service for inspection and maintenance purposes.

An IR or thermography arrangement or imaging device, that may in embodiments be in the form of a camera, is typically provided with a visual light (VL) imaging system configured to capture a VL image, an IR imaging system configured to capture an IR image, and a processor configured to process the captured IR image and the captured VL image into a combined image. Combination methods known in the art include e.g. fusion, blending/alpha-blending, picture-in-picture and temperature thresholding, or combinations of said methods. The use of combined IR/VL images is advantageous as it enables analysis and identification of variations in temperature in an object using IR data from the IR image while at the same time displaying enough data from the VL image to simplify orientation and recognition of objects in the resulting image for a user using the imaging device.

A variety of methods for presenting a thermal image combined with a corresponding visible light image exists, wherein an IR image may e.g. be moved, resized and reshaped inside a visible light image. There is still a need for new methods for presenting thermal images that can improve the ease of viewing and interpreting the thermal images. Attempts have been made to combine and mix pixels, a process sometimes referred to as fusion or blending, from the IR image and the visible light image of the same scene. One example of prior known techniques of mixing is changing the visible content of an image by either strictly selecting visible light image data for the pixel representation or strictly selecting IR image data dependent on whether the measured or calculated temperature value associated with the respective pixel is above or below a preset threshold of current temperatures of a scene. When a temperature threshold or interval is changed, the pixels of the image are globally reassigned to represent VL or IR image data dependent on the new temperature thresholds or intervals. The IR image data may be in grey scale or in color, according to assignment of color and/or grey scale values according to mapping to a preset palette. This assignment of pixel values is commonly referred to as pseudo coloring. For many user applications the connection between color/grey scale levels and temperatures is essential in the interpretation of IR or combined IR/VL, image data. Color or grey scale information in the image that draws an observer's attention while not representing information of interest therefor hinders the observer from correctly interpreting the information and correctly analyzing the imaged scene.

There is a need for providing visually improved images that makes it easier for an observer to interpret the content of the imaged scene.

SUMMARY

Various techniques are provided to obtain enhanced, or soft, transitions between different image data content. In some embodiments presented herein, the images are also processed to further reduce noise, thereby further removing distracting information that would have drawn the observer's attention and taken the attention away from the information in the image that was essential for interpretation of the imaged scene. In other words, transition smoothing, and possibly also additional noise reduction, according to embodiments of the invention improve the interpretability of the resulting images. The resulting images are visually further improved and therefore more pleasing to look at.

In embodiments of the invention, the resulting images are post-processed to further facilitate analysis and interpretation of the depicted scene by combining the resulting image with image information from a VL image depicting said scene such that contrast is enhanced.

According to different aspects of the invention, there are provided methods, arrangements and non-transitory machine readable media according to the present disclosure.

In an aspect of the invention, there is provided a method for generating an enhanced combined image having an enhanced transition between image areas representing different types of image information in a combined image comprising image information from a first image and a second image depicting the same or a substantially same part (e.g., at least partially overlapping parts) of an observed real world scene, using the same or a substantially same field of view (e.g., at least partially overlapping views), wherein the first image comprises a visible representation of one of the following types of image information:
i) visible light (VL) image information;
ii) infrared (IR) image information; or
iii) combined VL/IR image information; and
the second image comprises a visible representation of one of the types i), ii) or iii) of image information, wherein the first image and the second image do not comprise the same type (i, ii, iii) of image information;
the method comprising:
    determining a set of pixel coordinates based on a selection rule, wherein the set of pixel coordinates partly overlaps at least one area in the combined image where pixel values represent image information according to a first type of image information, and/or wherein the set of coordinates partly overlaps at least another area in the combined image where pixel values represent image information according to a second type of image information; and generating the enhanced combined image by assigning pixel values to pixels having coordinates comprised in the determined set of pixel coordinates, based on a mixing rule and pixel values of the corresponding coordinates of the combined image.

In an embodiment, the determined set of pixel coordinates comprise or are located along the border between pixels having values representing image information according to the first type of image information and pixels having values representing image information according to the second type of image information.

In an aspect of the invention, there is provided a method for generating a combined image from a first image and a second image depicting the same or a substantially same part of an observed real world scene, using the same or a substantially same field of view, to obtain the combined image having an enhanced transition between image areas representing different types of image information, wherein the first image comprises a visible representation of one of the following types of image information:
i) visible light (VL) image information;
ii) IR image information; or
iii) combined VL/IR image information; and
the second image comprises a visible representation of one of the types i), ii) or iii) of image information, wherein the first image and the second image do not comprise the same type (i, ii, iii) of image information;
the method comprising:
determining a first set of pixel coordinates from said first image based on a first selection rule;
determining a second set of pixel coordinates from said second image based on a second selection rule;
determining a third set of pixel coordinates from said first image and said second image based on a third selection rule; and
generating the combined image by:
for each pixel in the first image having pixel coordinates comprised in the first set of pixel coordinates, assigning the pixel value of said pixel in the first image to the corresponding pixel of the combined image,
for each pixel in the second image having pixel coordinates comprised in the second set of pixel coordinates, assigning the pixel value of said pixel in the second image to the corresponding pixel of the combined image, and
for each pixel in the combined image having pixel coordinates comprised in the third set of pixel coordinates, assigning pixel values based on a mixing rule and pixel values of the corresponding pixels of the first and second images.

In an embodiment, the pixel coordinates of the third set partly overlaps with the pixel coordinates of the first set and the pixel coordinates of the second set.

In an embodiment, the pixel coordinates of the first set, the second set and the third set are all mutually exclusive.

In an embodiment, the selection rule comprises temperature thresholding.

In an embodiment, the mixing rule comprises assigning pixel values to pixel coordinates according to the pixel values of the corresponding coordinates of the first and second image and a mathematical function describing the percentage of the pixel values from the first and second image that is to be assigned to each pixel comprised in determined set of pixel coordinates.

In an embodiment, the mathematical function is a selection of: a linear function; a parametric curve; an exponential function; a logarithmic function; and/or a logistic function.

In an embodiment, the selection rule comprises selecting pixel coordinates within a selected area.

In an embodiment, the selection rule comprises selecting pixel coordinates within a selected area based on settings of an IR or thermography arrangement (e.g., an IR or thermography arrangement in which the method is carried out).

In an embodiment, the selection rule comprises selecting pixel coordinates within a selected area in response to an input selection received from an input device of the IR or thermography arrangement.

In an aspect of the invention there is provided an IR or thermography arrangement for generating an enhanced combined image having an enhanced transition between image areas representing different types of image information in a combined image comprising image information from a first image and a second image depicting the same or a substantially same part of an observed real world scene, using the same or a substantially same field of view, wherein the first image comprises a visible representation of one of the following types of image information:
i) visible light (VL) image information;
ii) infrared (IR) image information; or
iii) combined VL/IR image information; and
the second image comprises a visible representation of one of the types i), ii) or iii) of image information, wherein the first image and the second image do not comprise the same type (i, ii, iii) of image information;
the IR or thermography arrangement comprising:
an IR imaging system configured to capture an IR image of a scene;
a visible light (VL) imaging system configured to capture a VL image of the scene; and
a processor arranged to:
determine a set of pixel coordinates based on a selection rule, wherein the set of pixel coordinates partly overlaps at least one area in the combined image where pixel values represent image information according to a first type of image information, and/or wherein the set of coordinates partly overlaps at least another area in the combined image where pixel values represent image information according to a second type of image information, and
generate the enhanced combined image by assigning pixel values to pixels having coordinates comprised in the determined set of pixel coordinates, based on a mixing rule and pixel values of the corresponding coordinates of the combined image.

In an embodiment, the determined set of pixel coordinates comprise or are located along the border between pixels having values representing image information according to the first type of image information and pixels having values representing image information according to the second type of image information.

In an aspect of the invention there is provided an IR or thermography arrangement for generating a combined image from a first image and a second image depicting the same part or a substantially same part of an observed real world scene, using the same or a substantially same field of view, to obtain the combined image having an enhanced transition between image areas representing different types of image information, wherein the first image comprises a visible representation of one of the following types of image information:
i) visible light (VL) image information;
ii) IR image information; or
iii) combined VL/IR image information; and
the second image comprises a visible representation of one of the types i), ii) or iii) of image information, wherein the first image and the second image do not comprise the same type (i, ii, iii) of image information;
the IR or thermography arrangement comprising:
an IR imaging system configured to capture an IR image of a scene;
a visible light (VL) imaging system configured to capture a VL image of the scene; and
a processor arranged to:
determine a first set of pixel coordinates from said first image based on a first selection rule,
determine a second set of pixel coordinates from said second image based on a second selection rule,
determine a third set of pixel coordinates from said first image and said second image based on a third selection rule, and
generate the combined image by
for each pixel in the first image having pixel coordinates comprised in the first set of pixel coordinates, assigning the pixel value of said pixel in the first image to the corresponding pixel of the combined image,
for each pixel in the second image having pixel coordinates comprised in the second set of pixel coordinates, assigning the pixel value of said pixel in the second image to the corresponding pixel of the combined image, and
for each pixel in the combined image having pixel coordinates comprised in the third set of pixel coordinates, assigning pixel values based on a mixing rule and pixel values of the corresponding pixels of the first and second images.

In an aspect of the invention there is provided a non-transitory machine-readable medium storing a plurality of machine-readable instructions which, when executed by one or more processors of a device, cause the device to perform a method of generating an enhanced combined image having an enhanced transition between image areas representing different types of image information in a combined image comprising image information from a first image and a second image depicting the same or a substantially same part of an observed real world scene, using the same of a substantially same field of view, wherein the first image comprises a visible representation of one of the following types of image information:
i) visible light (VL) image information;
ii) infrared (IR) image information; or
iii) combined VL/IR image information; and
the second image comprises a visible representation of one of the types 1), ii) or iii) of image information, wherein the first image and the second image do not comprise the same type (i, ii, iii) of image information;
the method comprising:
determining a set of pixel coordinates based on a selection rule, wherein the set of pixel coordinates partly overlaps at least one area in the combined image where pixel values represent image information according to a first type of image information, and/or wherein the set of coordinates partly overlaps at least another area in the combined image wherein pixel values represent image information according to a second type of image information; and
generating the enhanced combined image by assigning pixel values to pixels having coordinates comprised in the determined set of pixel coordinates, based on a mixing rule and pixel values of the corresponding coordinates of the combined image.

In an embodiment, the machine-readable medium comprises a plurality of machine-readable instructions which when executed by one or more processors of a device are further configured to cause the device to perform any or all of the method steps or functions described herein.

Various techniques disclosed herein relate to enhancement of images wherein a part of the pixels in the image represent a first type of image data and the remaining pixels represent a second type of image data representation. For instance, picture-in-picture images or images obtained through temperature threshold fusion or blending may advantageously be enhanced using method embodiments described herein.

Embodiments presented herein provide the advantages of maintaining the possibilities to interpret certain color and/or grey scale values as certain temperatures, according to intuitive human perception or according to selected settings, but with a more visually pleasing appearance.

The enhanced image is also easier for a human observer to interpret as distracting elements that have little or no significance for the interpretation and analysis of the imaged scene, and which are present in the original image, are removed through the image enhancement process according to embodiments presented herein. In other words, the observer/user's attention will not be drawn to details that in the unprocessed image visually stand out even though they are not much of interest for the interpretation and analysis.

All of the embodiments presented herein may be applied to and improve the visual appearance of any image that comprises a combination of IR and VL image data, wherein all pixels are not represented according to the same image data setting. Picture-in-picture images and threshold fusion images are merely two examples of various types of relevant image wherein the pixels represent different types of image data within the same image, thereby rendering visible transitions between the different types of image data in the image. The image enhancement process of embodiments presented herein relate to visually enhancing the transitions between in the combined image that represent different types of image information (e.g. between IR and VL; between IR and combined IR/VL; or between VL and combined IR/VL).

A picture-in-picture image may be composed in a number of different ways. In general, all pixels within a selected area are represented according to a first image data setting (IR, VL or a mix of IR and VL) and all pixels outside the selected area are represented according to a second image data setting (IR, VL or a mix of IR and VL) that is not the same as the first image data setting. In other words, the selected area may be represented as IR image data and the rest as VL image data; the selected area may be represented as VL image data and the rest as IR image data; the selected area may be represented as IR image data and the rest as mixed image data; the selected area may be represented as VL image data and the rest as mixed image data; the selected area may be represented as mixed image data and the rest as VL image data; or the selected area may be represented as mixed image data and the rest as IR image data.

In a threshold fusion image, one or more temperature thresholds or temperature intervals are set, and the pixels associated with temperature values that are above or below a temperature threshold, or within a temperature interval, are represented according to a certain image data setting. For example, all pixels associated with temperatures within a certain temperature interval may be represented according to a first image data setting (IR, VL or a mix of IR and VL) and all pixels associated with temperatures outside the temperature interval are represented according to a second image data setting (IR, VL or a mix of IR and VL) that is not the same as the first image data setting. In another example, all pixels associated with temperatures equal to or above a certain temperature threshold value may be represented according to a first image data setting (IR, VL or a mix of IR and VL) and all pixels associated with temperatures below the temperature threshold value are represented according to a second image data setting (IR, VL or a mix of IR and VL) that is not the same as the first image data setting. In other words, pixels associated with temperatures within a certain temperature interval, above a set threshold or below a set threshold may be represented as IR image data and the remaining pixels as VL image data; pixels associated with temperatures within a certain temperature interval, above a set threshold or below a set threshold may be represented as VL image data and the remaining pixels as IR image data; pixels associated with temperatures within a certain temperature interval, above a set threshold or below a set threshold may be represented as IR image data and the remaining pixels as mixed image data; pixels associated with temperatures within a certain temperature interval, above a set threshold or below a set threshold may be represented as VL image data and the remaining pixels as mixed image data; pixels associated with temperatures within a certain temperature interval, above a set threshold or below a set threshold may be represented as mixed image data and the remaining pixels as VL image data; or pixels associated with temperatures within a certain temperature interval, above a set threshold or below a set threshold may be represented as mixed image data and the remaining pixels as IR image data.

For example, any combined IR/VL image data used in the images described above may be obtained using alpha-blending of IR and VL image data.

In all the picture-in-picture images and combined images described above, there are hard transitions between the different image data represented in the images, as each pixel is set to either IR, VL or a preset mix (e.g. alpha-blending according to a certain percentage of transparence or opacity) of IR and VL image data. Also, if the settings of temperature thresholds or intervals are changed for a fusion threshold image, this leads to a global change of the way the pixels of the image are represented, creating new hard transitions between the pixels represented according to different image data. Such hard transitions between image data of different types is illustrated in FIGS. 8a (picture-in-picture image) and 9 (fused/combined image).

BRIEF DESCRIPTION OF DRAWINGS

The patent or application file contains at least one drawing executed in color. Copies of this patent or patent application publication with color drawings(s) will be provided by the Office upon request and payment of the necessary fee.

Embodiments of the invention will now be described in more detail with reference to the appended drawings, wherein:

FIGS. 6a to 6d show graphs describing picture-in-picture imaging according to embodiments.

Embodiments of the invention and their advantages are best understood by referring to the detailed description that follows. It should be appreciated that like reference numerals are used to identify like elements illustrated in one or more of the figures.

DETAILED DESCRIPTION

Introduction

There is a need for providing visually improved images that are more pleasing to look at and that further makes it easier for an observer to interpret the content of the imaged scene.

This is achieved by various embodiments of the invention, wherein enhanced, soft, or gradual transitions between different image data content is obtained through careful image processing including selection of image data according to selection rules and mixing of image data according to mixing rules to obtain optimal pixel values for pixel coordinates identified as a part of a transition area in an image.

A combined image is defined herein as an image comprising a visual representation of more than one type of image information (e.g. IR and VL; or IR and mixed IR/VL; or VL and mixed IR/VL). The image processing embodiments are further described below.

The term transition area is herein defined as a selected or identified area in a combined image that comprises a set of pixel coordinates, wherein the set of pixel coordinates partly overlaps at least one area in the combined image wherein the pixel values represent image information according to the first type of image information; and/or wherein the set of coordinates partly overlaps at least one area in the combined image wherein the pixel values represent image information according to the second type of image information.

In embodiments, the transition area is selected or determined to comprise or be located along the border between pixels having values representing image information according to the first type of image information and pixels having values representing image information according to the second type of image information. In other embodiments, the transition area comprises pixel coordinates that are associated with certain temperature values or temperature intervals.

Figure 4:
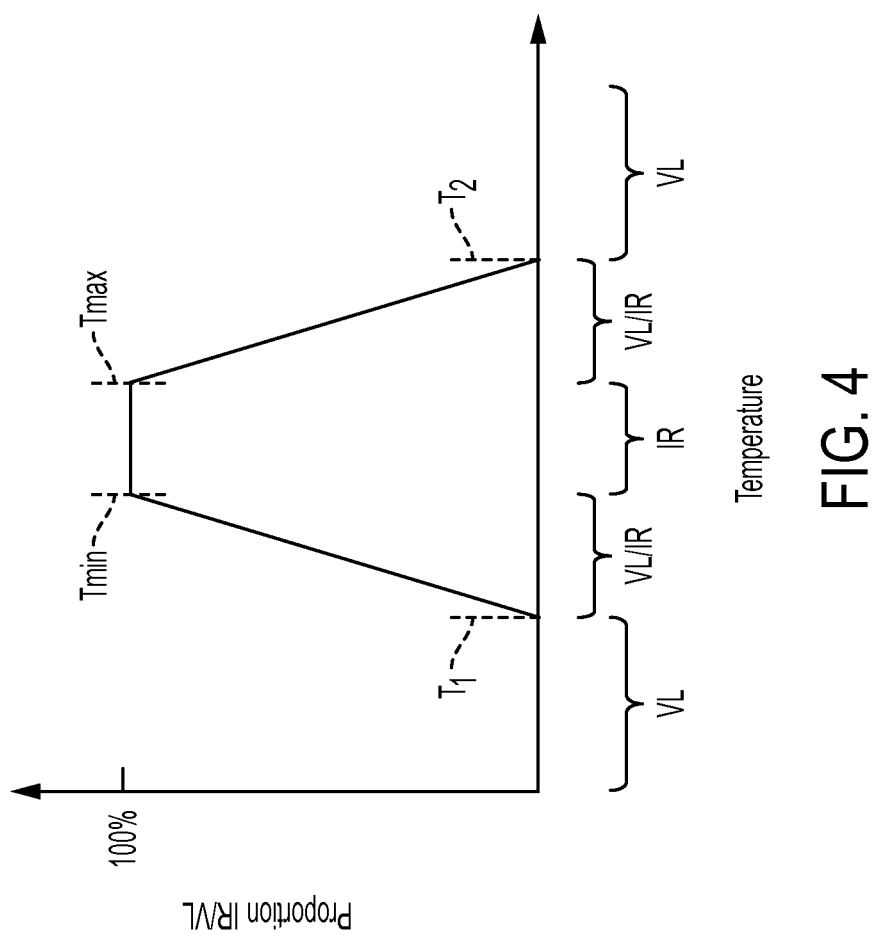
FIG. 4 shows a graph describing temperature thresholds according to an embodiment.
Figures 5A, 5B:
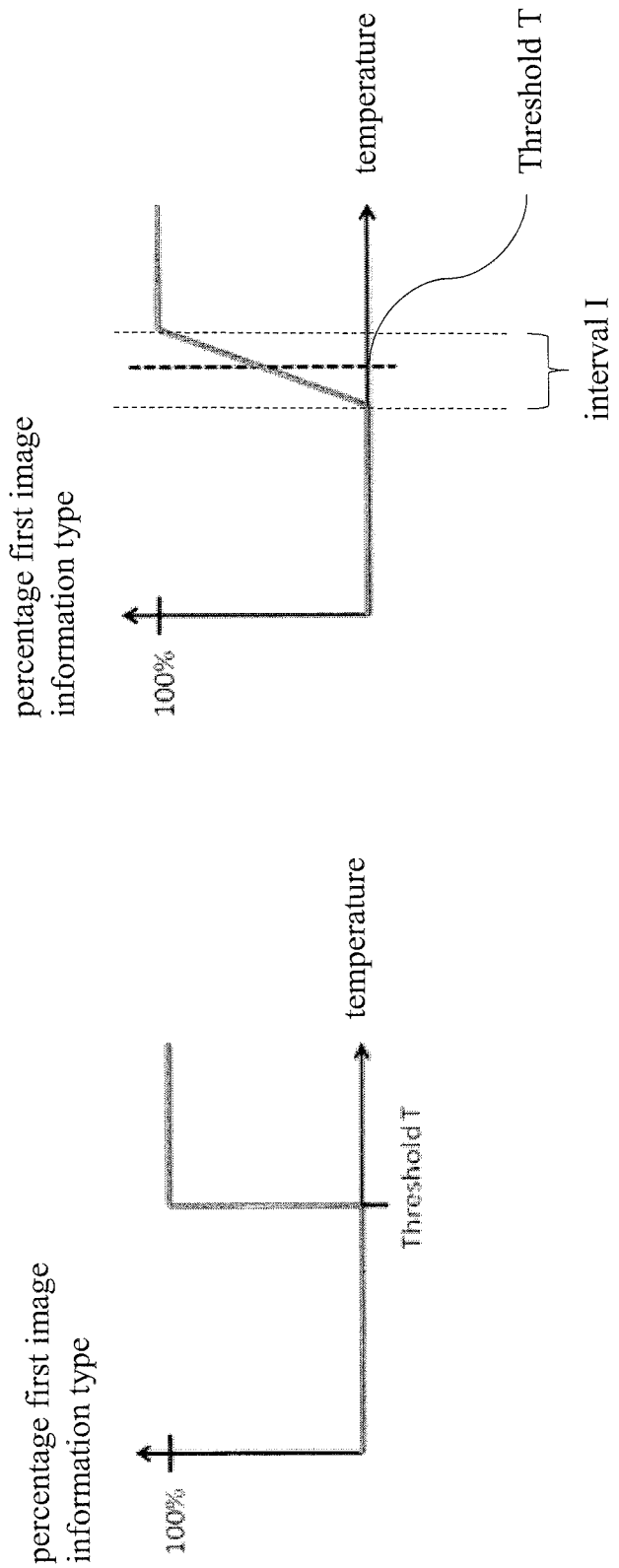
FIGS. 5a to 5d show graphs describing temperature threshold imaging according to embodiments.
Figures 5C, 5D:
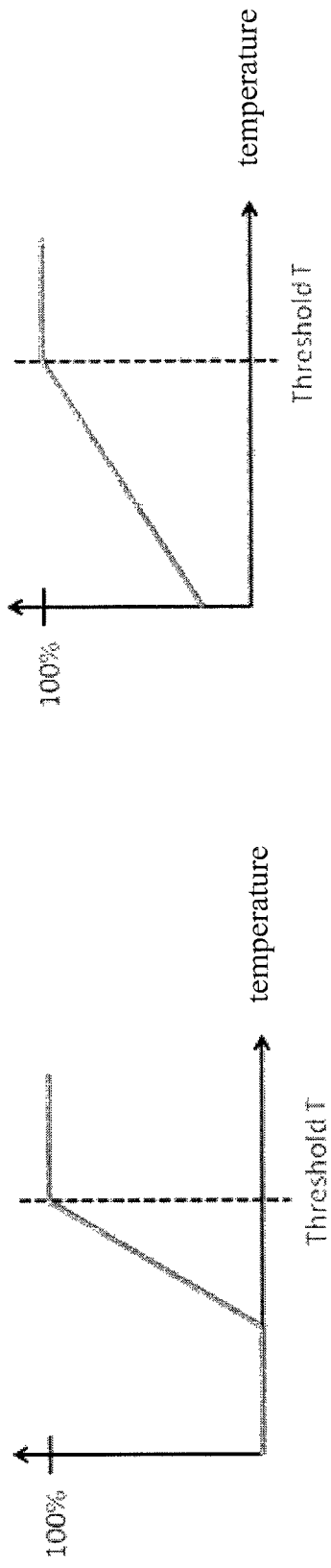
Figure 6D:
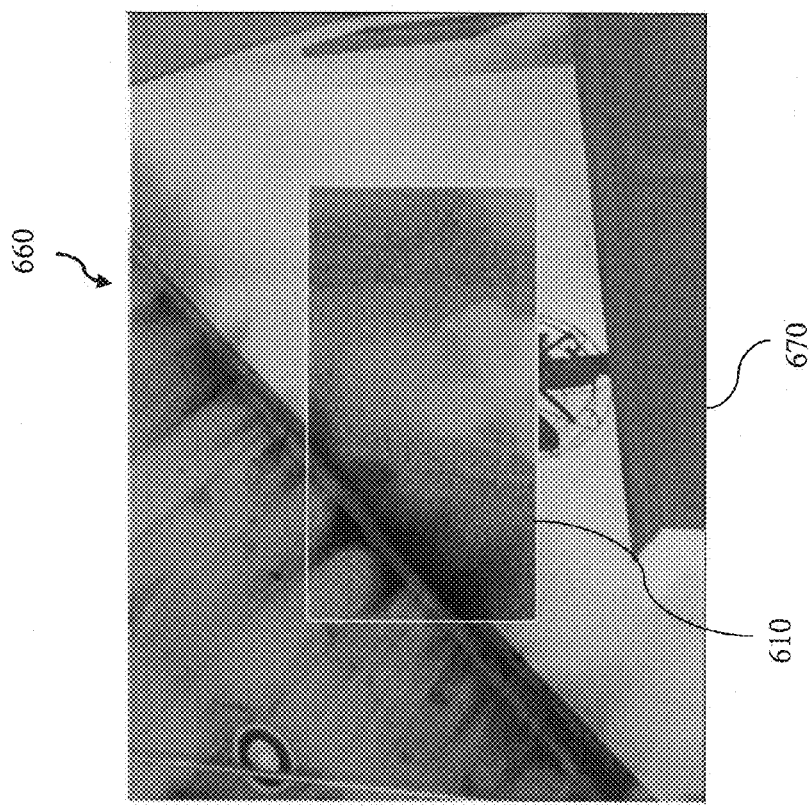
Figure 6C:
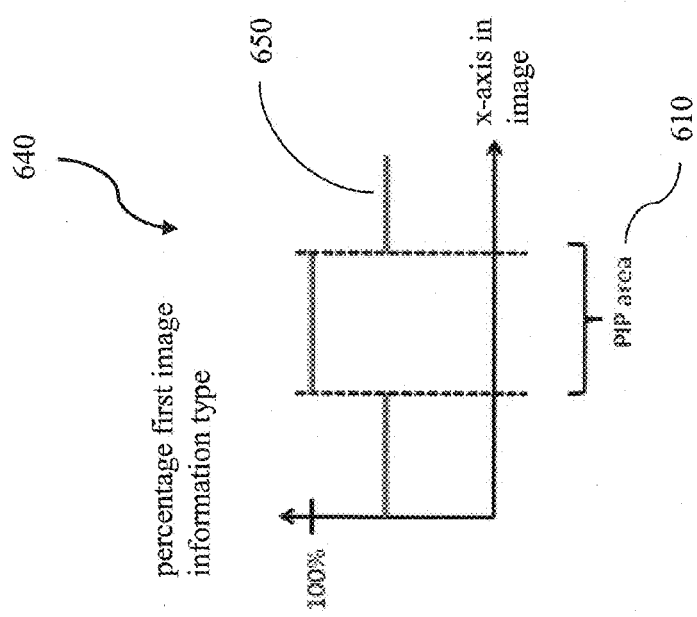
Figure 7B:
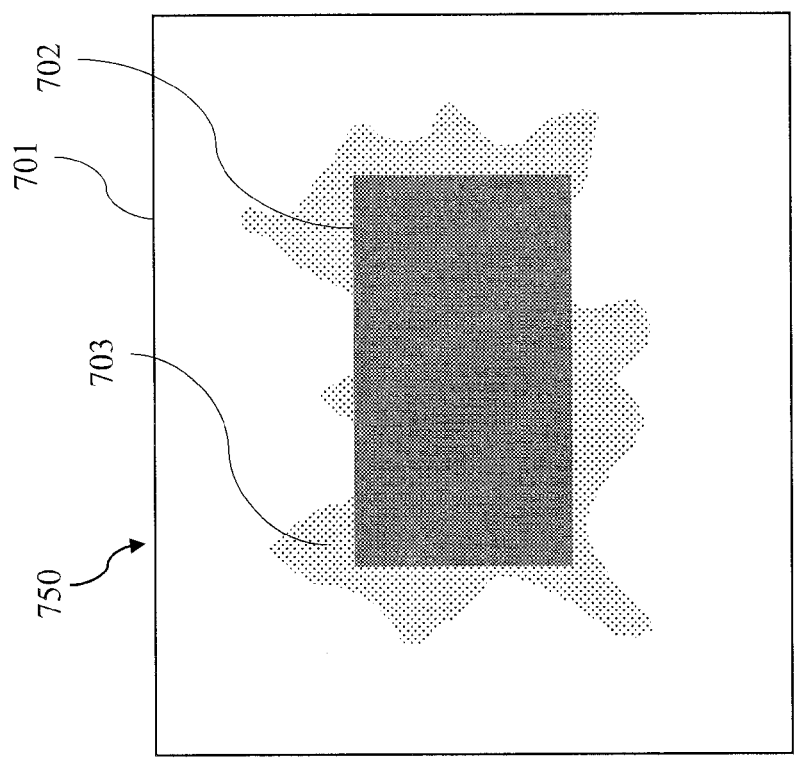
FIGS. 7a to 7c show simplified examples of a picture-in-picture image without and with image enhancement according to embodiments presented herein.
Figure 8B:
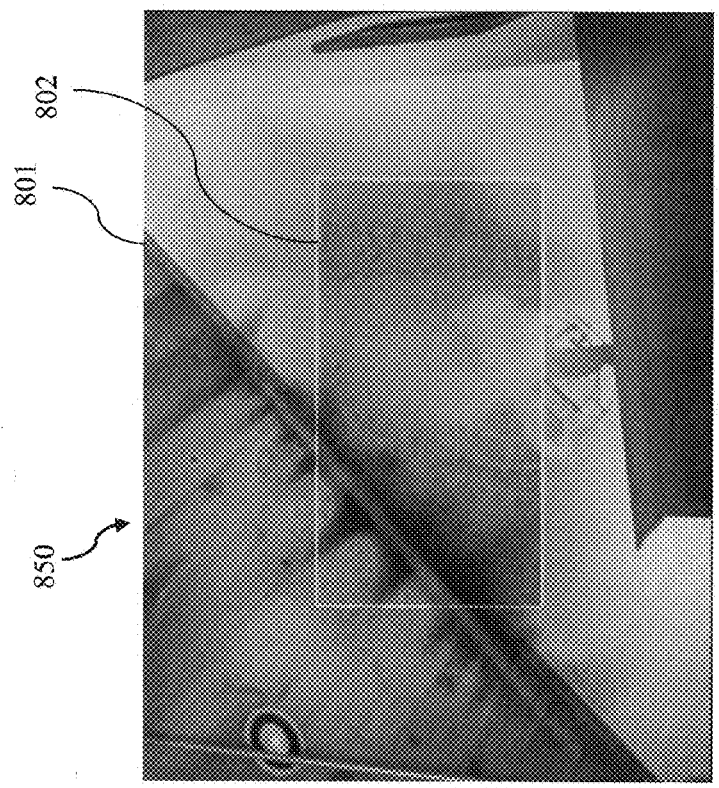
FIGS. 8a and 8b show an example of a picture-in-picture image without and with image enhancement, respectively, according to embodiments presented herein.

Different examples of transition areas are illustrated as the ramping lines in FIGS. 4, 5b-d and 6b, reference number 703 in FIG. 7b and, the area outside the picture-in-picture frame in FIGS. 6c and 6d and the diffuse transition between 801 and 802 in FIG. 8b. The figures are further described below.

Figure 9:
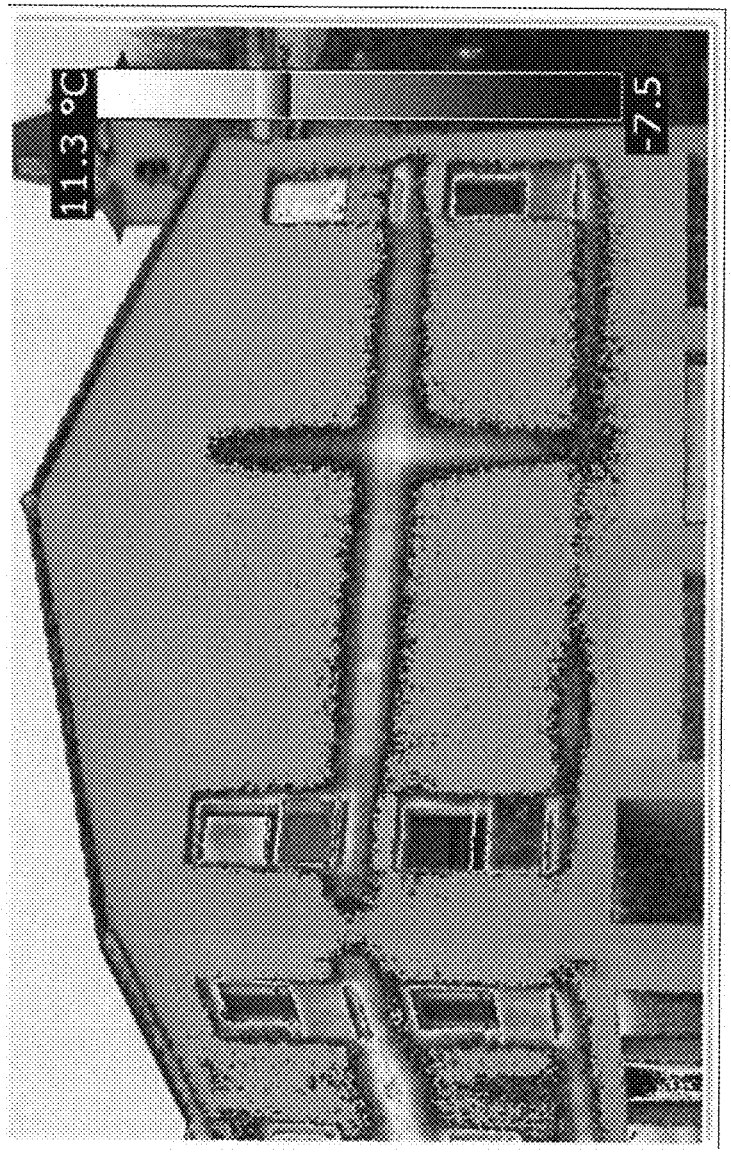
FIG. 9 shows an IR image obtained using temperature thresholding, where no image enhancement according to embodiments of the disclosure has been performed.

In combined images obtained through temperature thresholding, the sharp temperature threshold leads to a noisy combined image with hard transitions between the different types of image information, as illustrated by image 900 in FIG. 9.

Methods described herein reduce the noise considerably by providing smoothened or gradual transitions between areas in an image representing different types of image information. In some embodiments herein, the images are also processed to further reduce noise, thereby further removing distracting information that would have drawn the observer's attention and taken the attention away from the information in the image that was essential for interpretation of the imaged scene. In other words, transition smoothing, and possibly also additional noise reduction, according to embodiments of the invention improve the interpretability of the resulting images.

According to different aspects of the invention, there are provided methods, arrangements and non-transitory machine readable mediums according to the present disclosure.

According to an aspect of the invention, there is provided an IR or thermography arrangement that comprises an IR camera and a VL camera configured to capture images of an observed real world scene. Optionally, the IR or thermography arrangement is configured to present captured and/or processed images to a user, on a display that may be integrated in, connected to or communicatively coupled to the IR or thermography arrangement. Alternatively, the captured and/or processed images may be stored and retrieved for viewing and analysis on a display of an external processing device, at a later time.

According to various embodiments, the user is able to control the enhancement or smoothing of transitions in a combined image through input of selection parameters, using one or more input device integrated in, connected to or communicatively coupled to the IR or thermography arrangement, or integrated in, connected to or communicatively coupled to the external processing device. The input may include a selection of the following:

marking and selection of an area in a combined image;
selection of one or more temperature thresholds or temperature intervals;
selection of span and/or level for display of the temperature related information of the combined image; and
adjustment of the mixing options in the mixing rule applied to a defined transition area, e.g. the size of a geometrically selected area; the temperatures on which a temperature threshold or interval selection of a transition area is based; color/intensity/grey scale settings for the display of the combined image and/or the processed combined image; and/or which amounts of the first and the second image information type that different parts of the transition area should be set to after mixing.

System Architecture

Figure 1:
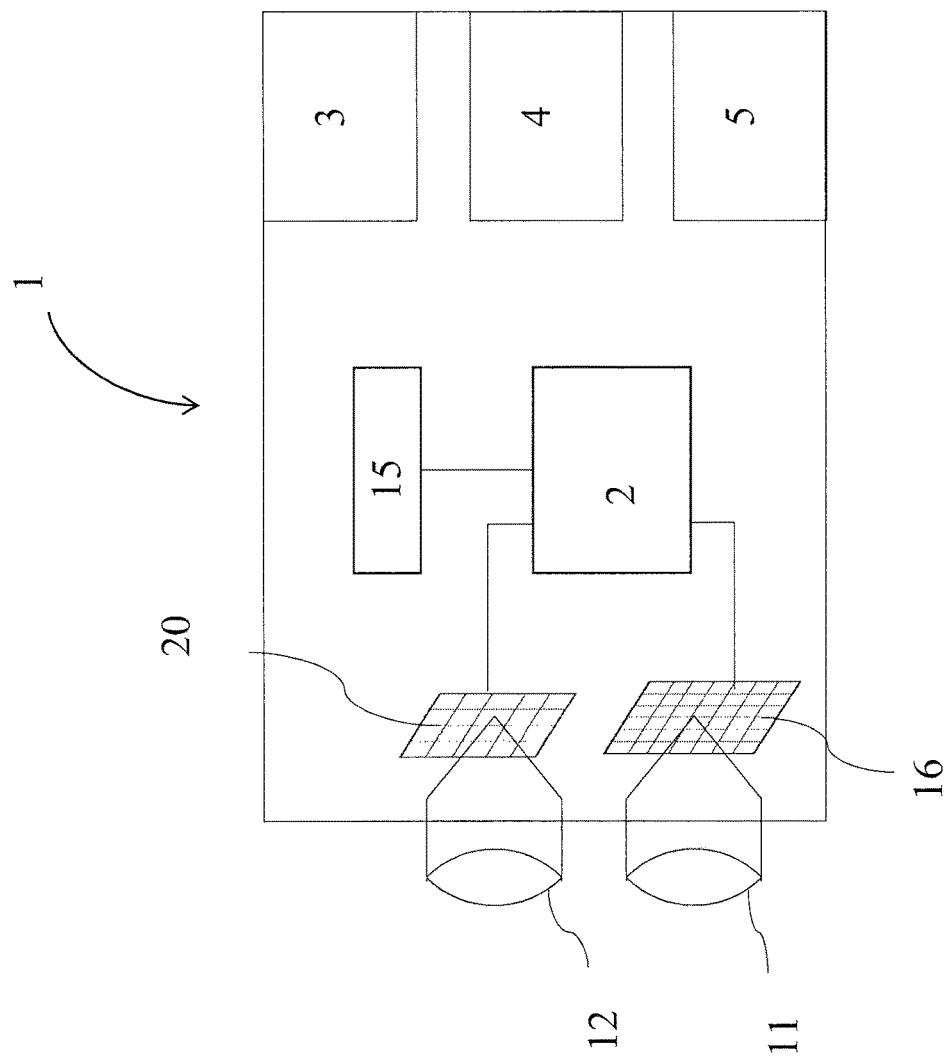
FIG. 1 shows a schematic view of an IR or thermography arrangement according to embodiments of the disclosure.

FIG. 1 shows a schematic block diagram of an embodiment of an arrangement 1 for facilitating or enabling easy analysis and interpretation of associated IR and visible light (VL) image data in an IR image and a VL image depicting a scene. The arrangement 1 may be a thermography arrangement, or an IR arrangement processing IR radiation also outside of the thermal IR frequency spectrum. Embodiments herein may be applied to a thermography arrangement or an IR arrangement even though descriptions of the embodiments may use one of the terms for simplicity reasons. According to an embodiment, the IR or thermography arrangement 1 comprises an IR imaging system 12 having an IR sensor 20, the IR imaging system 12 being configured to capture an IR image of the scene according to a first field of view. According to an embodiment, the IR or thermography arrangement 1 further comprises a VL imaging system 11 having a visible (or visual) light sensor 16, the VL imaging system 11 being configured to capture a visible light image according to a second field of view.

The IR imaging system 12 comprised in the IR or thermography arrangement 1 is configured to capture IR images and the visible light (VL) imaging system 11 is configured to capture visible light (VL) images, in manners known per se (e.g., in one or more conventional ways as would be understood by one skilled in the art). According to an embodiment, the IR image and the visible light image are captured simultaneously. According to another embodiment, the IR image and the visible light image are captured in close succession. According to a third embodiment, the IR image and the visible light image are captured at time instances further apart.

After capturing of one or more IR and/or VL images, the captured one or more images are transmitted to a processor 2 configured to perform image processing operations.

According to an embodiment, the processor 2 is arranged to process at least one of the visible light image and the IR image such that the field of view represented in the visible light image substantially corresponds to the field of view represented in the IR image.

In embodiments of the present disclosure, the processor 2 is configured to determine a set of pixel coordinates based on a selection rule, wherein the set of pixel coordinates partly overlaps at least one area in the combined image where pixel values represent image information according to a first type of image information, and/or wherein the set of coordinates partly overlaps at least another area in the combined image where pixel values represent image information according to a second type of image information, and to generate the enhanced combined image by assigning pixel values to pixels having coordinates comprised in the determined set of pixel coordinates, based on a mixing rule and pixel values of the corresponding coordinates of the combined image, wherein the combined image comprises image information from a first image and a second image depicting a substantially same part of the scene using a substantially same field of view.

In embodiments of the present disclosure, the processor 2 is configured to determine a first set of pixel coordinates from said first image based on a first selection rule, determine a second set of pixel coordinates from said second image based on a second selection rule, determine a third set of pixel coordinates from said first image and said second image based on a third selection rule, and generate the combined image by for each pixel in the first image having pixel coordinates comprised in the first set of pixel coordinates, assigning the pixel value of said pixel in the first image to the corresponding pixel of the combined image, for each pixel in the second image having pixel coordinates comprised in the second set of pixel coordinates, assigning the pixel value of said pixel in the second image to the corresponding pixel of the combined image, and for each pixel in the combined image having pixel coordinates comprised in the third set of pixel coordinates, assigning pixel values based on a mixing rule and pixel values of the corresponding pixels of the first and second images.

In some embodiments, the first image comprises a visible representation of the first type of image information comprising one of the following types of image information:

i) visible light (VL) image information representing the captured VL image,
ii) infrared (IR) image information representing the captured IR image, or
iii) combined VL/IR image information,
wherein the second image comprises a visible representation of the second type of image information comprising one of the types i), ii) or iii) of image information, and wherein the first image and the second image do not comprise the same type of image information.

The processor 2 communicates with a memory 15 where parameters are kept ready for use by the processor 2, and where the images being processed by the processor 2 can be stored if the user desires. The one or more memories 15 may comprise a selection of a hard disk drive, a floppy disk drive, a magnetic tape drive, an optical disk drive, a CD or DVD drive (R or RW), or other removable or fixed media drive.

According to an embodiment, the IR or thermography arrangement 1 comprises a display 4 for presenting a graphical representation of a VL (visual light), an IR and/or a mixed VL/IR image of a scene.

In an embodiment, the arrangement 1 comprises a communication interface 5 comprising a variety of communication techniques, known to a person skilled in the art, for communicating with internal and/or external devices.

In embodiments, the arrangement 1 comprises one or more input devices 3 for receiving an indication from a user of the IR or thermography arrangement 1 interacting with the one or more input devices 3, to generate a control signal in response to the received indication, and to send the control signal to the processor 2 for further processing. The processor 2 is according to embodiments configured to receive a control signal from the one or more input devices 3 and to process the received control signal, e.g. by performing a calculation—such as processing a retrieved, received or captured image; retrieving information from the memory 15; prompting information on the display 4; communicating information to an external device via the communication interface 5, or store information in the memory 15.

In various embodiments, the processor 2 is configured to perform any or all of the method steps and functions described herein.

Method Embodiments

FIGS. 2a-2e show flow diagrams of method embodiments according to the invention, the method comprising selection of pixels and mixing of pixels from two images depicting the same scene.

Figure 2A:
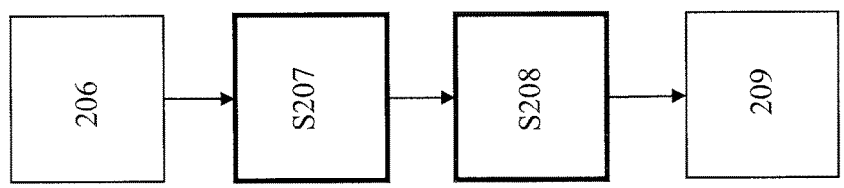
FIGS. 2a-c show flow diagrams of methods according to embodiments.
Figure 2B:
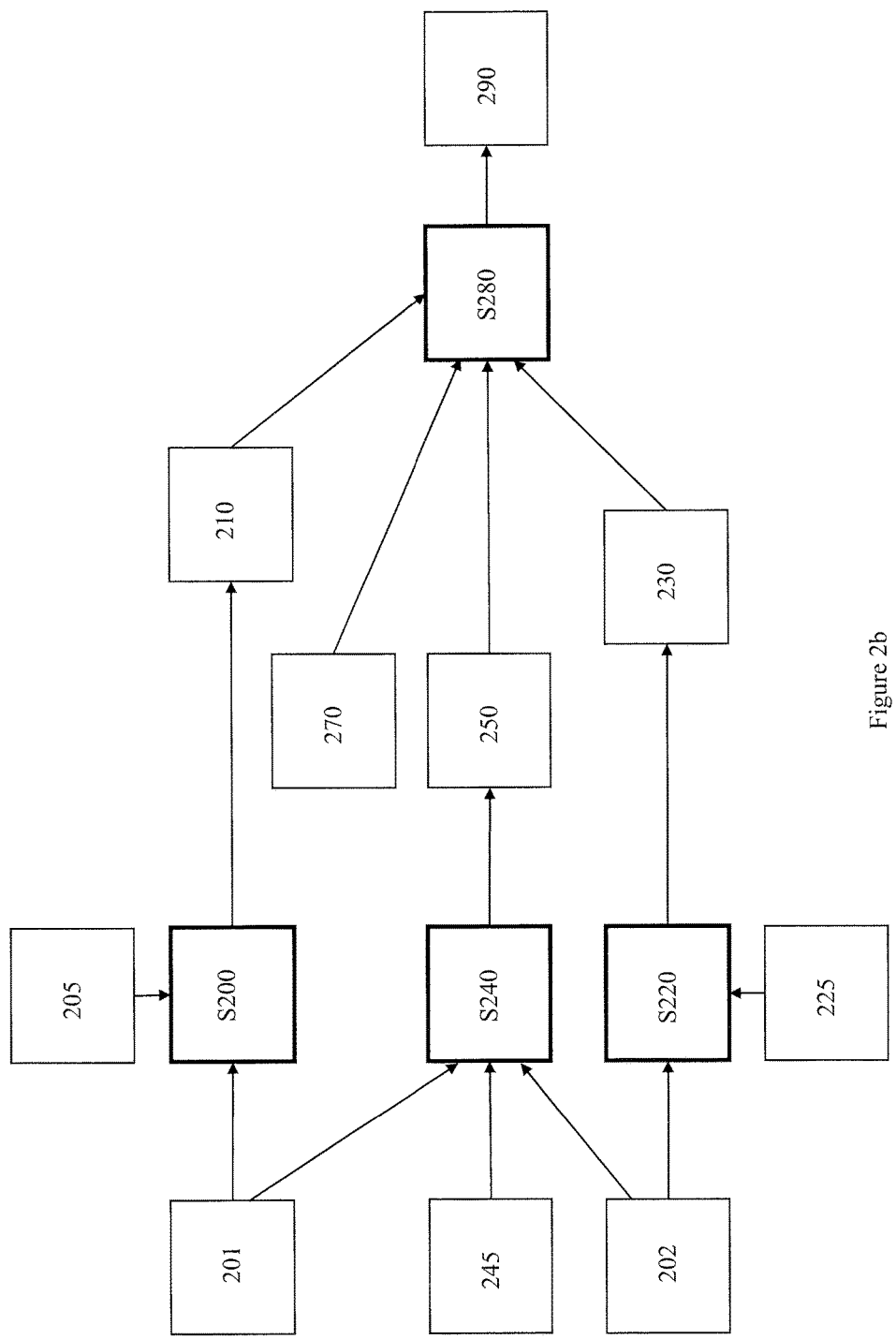
Figure 2C:
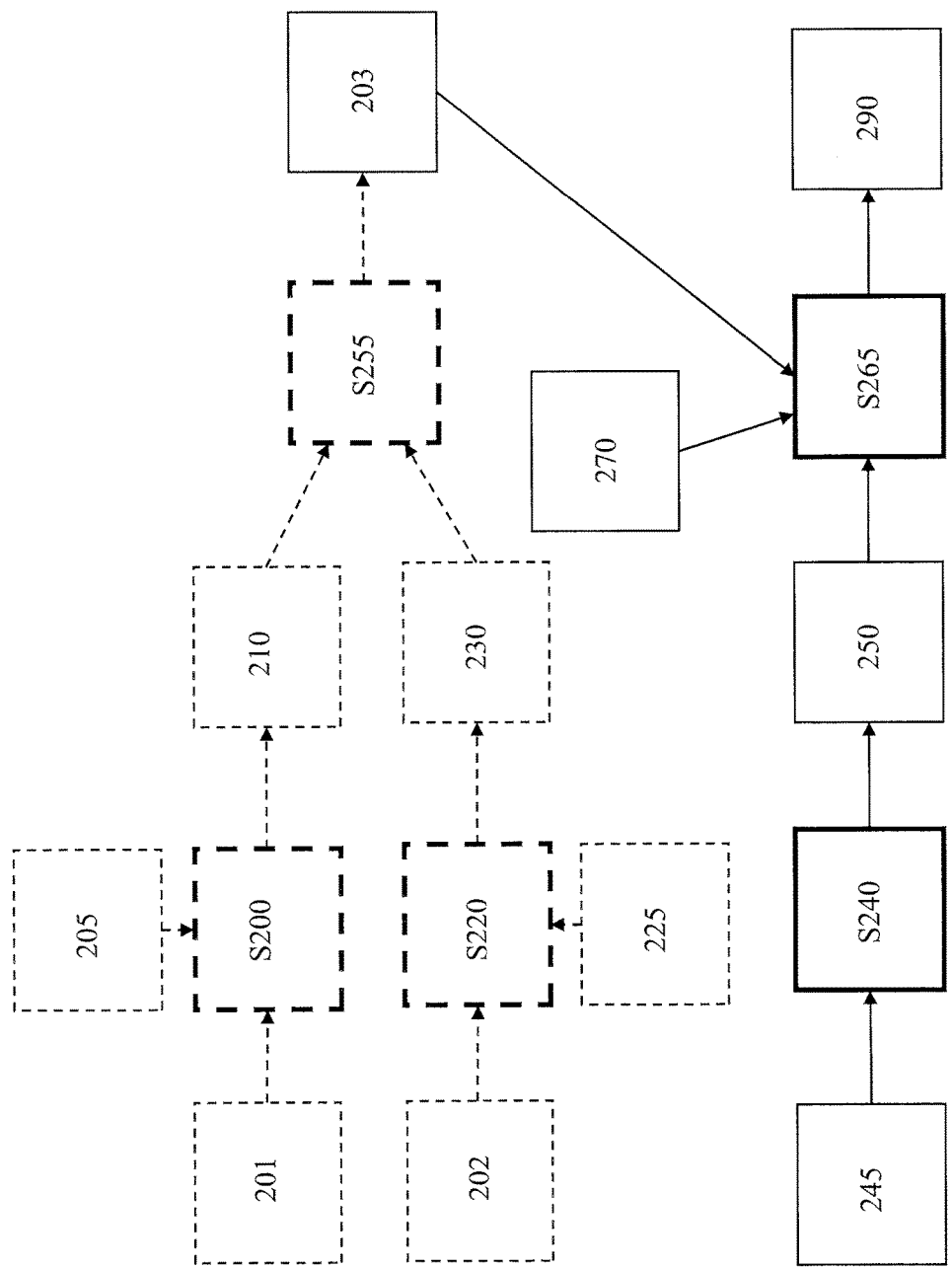

According to embodiments, the processor 2 is configured to perform any or all of the method steps and functions presented in connection with FIGS. 2a-2c.

In FIG. 2a, there is shown a method for generating an enhanced combined image 209 having an enhanced transition between image areas of an original combined image 206, the image areas each representing a different type of image information the method comprising:

In step S207: Determining a set of pixel coordinates based on a selection rule, wherein the set of pixel coordinates partly overlaps at least one area in the combined image where pixel values represent image information according to a first type of image information, and/or wherein the set of coordinates partly overlaps at least another area in the combined image where pixel values represent image information according to a second type of image information, and In step S208: Generating the enhanced combined image 209 by assigning pixel values to pixels having coordinates comprised in the determined set of pixel coordinates, based on a mixing rule and pixel values of the corresponding coordinates of the original combined image 206.

In embodiments, the original combined image 206 comprises image information from a first image and a second image depicting the same or a substantially same part (e.g., at least partially overlapping parts) of an observed real world scene, using the same or a substantially same field of view (e.g., at least partially overlapping views), wherein the first image comprises a visible representation of one of the following types of image information:

i) visible light (VL) image information;
ii) infrared (IR) image information; or
iii) combined VL/IR image information; and the second image comprises a visible representation of one of the types i), ii) or iii) of image information, wherein the first image and the second image do not comprise the same type (i, ii, iii) of image information.

In an embodiment, the determined set of pixel coordinates comprise or are located along the border between pixels having values representing image information according to the first type of image information and pixels having values representing image information according to the second type of image information.

In an embodiment, the selection rule comprises temperature thresholding.

In an embodiment, the selection rule comprises selecting pixel coordinates within a selected area.

In an embodiment, the selection rule comprises selecting pixel coordinates within a selected area based on settings of an IR or thermography arrangement.

In an embodiment, the selection rule comprises selecting pixel coordinates within a selected area in response to an input selection received from an input device of an IR or thermography arrangement.

In an embodiment, the mixing rule comprises assigning a pixel value to each pixel having coordinates comprised in the determined set of pixel coordinates based on the pixel values of the pixels having corresponding coordinates in the first and second image, and on a mathematical function for calculating a percentage of the pixel values from the first and second image that is to be assigned to the pixel comprised in the determined set of pixel coordinates.

In an embodiment, the mathematical function is a selection of: a linear function; a parametric curve; an exponential function; a logarithmic function; and/or a logistic function.

The original combined image 206 comprises visual representation of IR and VL image and may as defined above be combined in a number of ways from different starting images comprising based on different types of image information. All of the embodiments presented herein may be applied on and improve the visual appearance of any image that comprises a combination of IR and VL image data, wherein all pixels are not represented according to the same image information setting. Picture-in-picture images and threshold fusion images are only two relevant examples of images wherein the pixels represent as different types of image data within the same image, thereby rendering visible transitions between the different types of image data in the image. The image enhancement process of embodiments presented herein relate to visually enhancing the transitions between in the combined image that represent different types of image information (e.g. between IR and VL; between IR and combined IR/VL; or between VL and combined IR/VL).

According to embodiments, wherein the selected set of pixels comprises pixels representing the first type of image information, the selection rule of Step S207 comprises selecting pixels having coordinates neighboring to pixels representing the second type of image information and pixels having coordinates within a certain number of pixels from pixels representing the second type of image information. E.g. pixels representing the first type of information and being within a distance of 4 pixels from a pixel representing the second type of information may be selected according to the selection rule. The skilled person recognizes that any suitable distance/number of pixels may be used in the selection rule.

The set of pixel coordinates determined in Step S207 may also be referred to as a transition area. The transition area is determined as an area in the original combined image that comprises pixels representing the first type of image information (IR, VL or IR/VL information) and pixels representing the second type of image information (IR, VL or IR/VL information—different from the first image information type).

The transition area may in embodiments be determined in relation to a specific area in the combined image, such as a selected or predetermined picture-in-picture area, as illustrated by an exemplary embodiment in FIGS. 7a to 7c, 8a and 8b. As is obvious to a person skilled in the art, a picture-in-picture area may have any geometric shape, e.g. a circle, an ellipse, a rectangle, or any combination of geometrical shapes or free form shape. Furthermore, the picture-in-picture area may have been defined through automatic selection, based on settings of the IR or thermography arrangement 1 or settings of a post-processing device configured to receive and combine two images, or it may have been selected in response to user input to the IR or thermography arrangement or the post-processing device.

In embodiments, the IR image information included in at least one of the first and second images used to create the combined image is within thermal information, and the selection rule is based on temperature thresholding, using temperature threshold values or intervals to determine which pixel coordinates are to be included in the selected set of pixel coordinates based on the measured or calculated temperature values associated with said pixel coordinates. In other words, in embodiments the transition area comprises pixel coordinates that are associated with certain temperature values or temperature intervals. Temperature threshold embodiments are described below with regard to FIGS. 4 and 5a-5d.

FIG. 4 shows an example of how various temperature thresholds can be set. In the example of FIG. 4, the first image information type comprised in the first image is VL image information, and the second image information type comprised in the second image is IR image information. According to the embodiment shown in FIG. 4, a threshold T1 and a threshold T2 are set that determine in this case an interval such that for all pixel coordinates that are associated with measured temperatures outside the interval, the corresponding pixels of the resulting combined image are assigned pixel values based solely on the corresponding pixels of the first image, or in other words represent 100% VL image information. Furthermore, two temperature thresholds Tmin and Tmax in FIG. 4 define an interval wherein all pixel coordinates that are associated with measured temperatures inside the interval, the corresponding pixels of the resulting combined image are assigned pixel values based solely on the pixel values of the second image, or in other words represent 100% IR image information. In the intervals between T1 and Tmin, and between Tmax and T2, all pixel coordinates that are associated with measured temperatures inside said intervals, the corresponding pixels of the resulting combined image are assigned pixel values based on a mix of the pixel values of the first image and the pixel values of the second image, or in other words a mix between IR and VL image information. In the example of FIG. 4, the mixing rule comprises a linear transition from 100% IR representation to 100% VL representation, but any other suitable kind of transition known to the skilled person is possible, For example, the transition may be a non-linear function such as a Bezier curve, an exponential function, a logarithmic function, a logistic function or it may be based on any other mathematical function well known in the art. The advantages of achieving a smoothened transition between the two types of image information will still be obtained. As can be seen from FIG. 4, the visual appearance of the resulting combined image depends on how the temperature thresholds or intervals are set, as this affects the extent of the transition area, and also in the mixing function applied in the transition area (linear transition, Bezier curve etc.) as this affects the percentage of the first and the second image information type that the pixel value of each pixel within the transition area represents.

FIGS. 5a to 5d show graphs illustrating how different combined images may be generated by use of different selection rules and mixing rules. In all the FIGS. 5b to 5d the transition functions are linear functions for simplicity reasons. As described above, the transition function may be a non-linear function such as a Bezier curve, an exponential function, a logarithmic function, a logistic function or it may be based on any other mathematical function well known in the art.

FIG. 5a shows a combined image according to the prior art, in which no enhancement, smoothing or gradual transition is performed between different types of image information represented in the image. For all pixel coordinates that are associated with measured temperatures below the temperature threshold T, the corresponding pixels of the resulting combined image are assigned pixel values based solely on the pixel values of the first image, or in other words represent only the first image information. For all pixel coordinates that are associated with measured temperatures above or equal to the temperature threshold T, the corresponding pixels of the resulting combined image are assigned pixel values based solely on the pixel values of the second image, or in other words represent only the second image information.

FIG. 5b shows a combined image having a gradual transition centered around the threshold T. In other words, in step S207, the selection rule comprises selecting a temperature interval I centered around a temperature threshold T. In step S208, all pixel coordinates that are associated with measured temperatures within the interval I, the corresponding pixels of the resulting combined image are assigned pixel values based on both the first and the second image, according to the mixing rule.

FIG. 5c shows a combined image having a gradual transition with the threshold T as an upper endpoint. For all pixel coordinates that are associated with measured temperatures above or equal to the temperature threshold T, the corresponding pixels of the resulting combined image are assigned pixel values based solely on the pixel values of the second image, or in other words represent only the second image information. According to this embodiment, in step S207, the selection rule comprises selecting a temperature interval I with an upper limit at the temperature threshold T and having either a preset temperature range or starting from a preset temperature value. In step S208, all pixel coordinates that are associated with measured temperatures within the interval I, the corresponding pixels of the resulting combined image are assigned pixel values based on both the first and the second image, according to the mixing rule.

FIG. 5d shows a combined image similar to the one in FIG. 5c, but all pixels in the image are assigned pixel values either based solely on the corresponding pixel values of the second image if the associated temperatures are above or equal to the value of the temperature threshold T, or on a mix of the pixel values of the corresponding pixels in the first and second image. In step S208, all pixel coordinates that are associated with measured temperatures within the interval I, the corresponding pixels of the resulting combined image are assigned pixel values based on both the first and the second image, according to the mixing rule.

All temperature thresholds and/or intervals may according to embodiments be set automatically based on rules and settings of the IR or thermography system 1 or through input selection input by a user interacting with an input device 3. Temperature thresholds and/or intervals that are predetermined in rules or settings of the IR or thermography arrangement 1 may have been set during production or calibration of the IR or thermography arrangement 1, or during operation based on for example automatic detection of the temperature range associated with the observed scene. The percentage or amount of VL image information and IR image information pixels in the resulting combined image is dependent on how T1 and T2 are set.

Figure 7A:
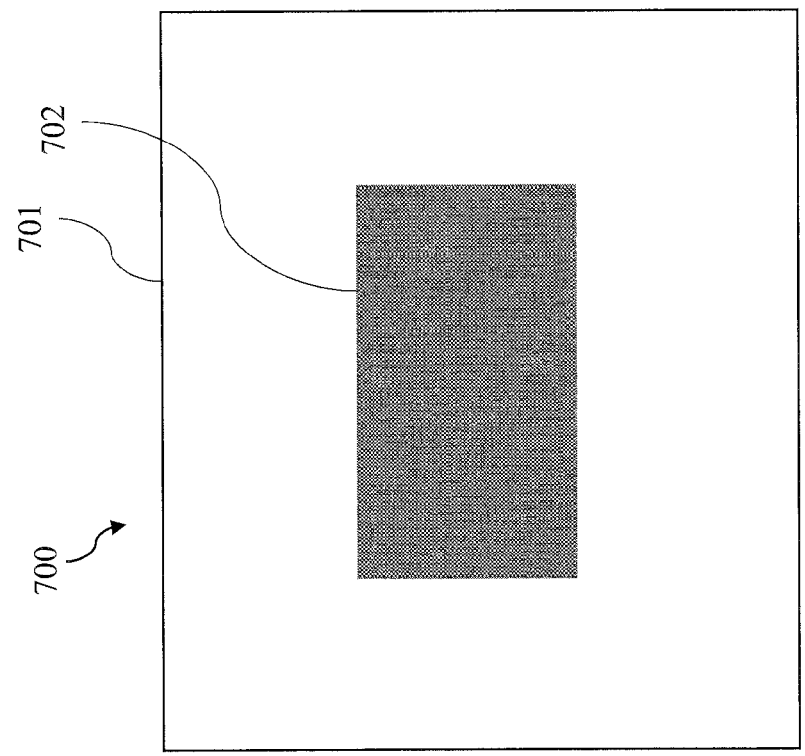
Figure 7C:
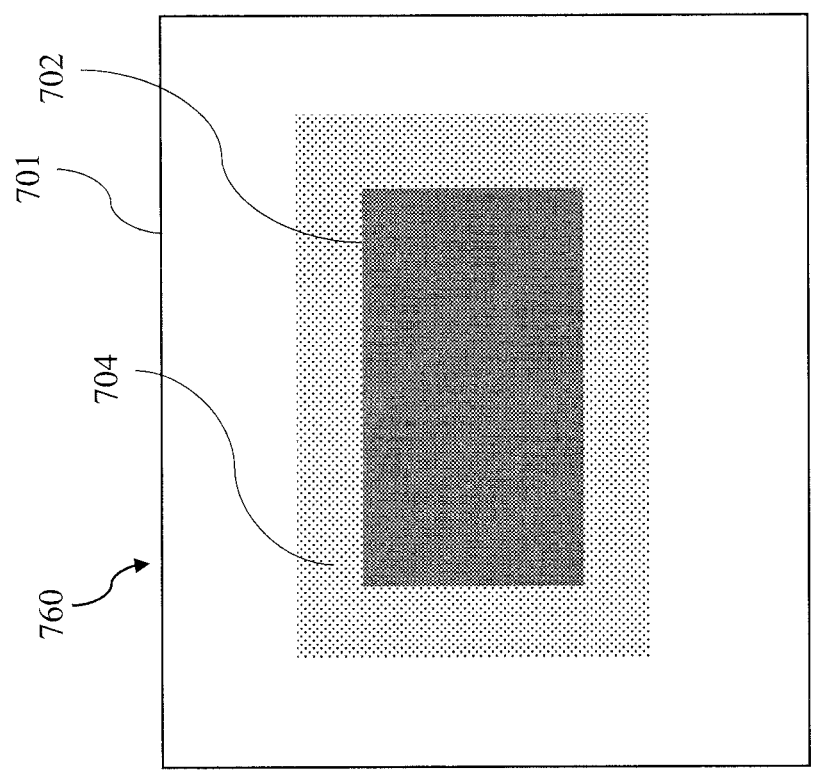
Figure 8A:
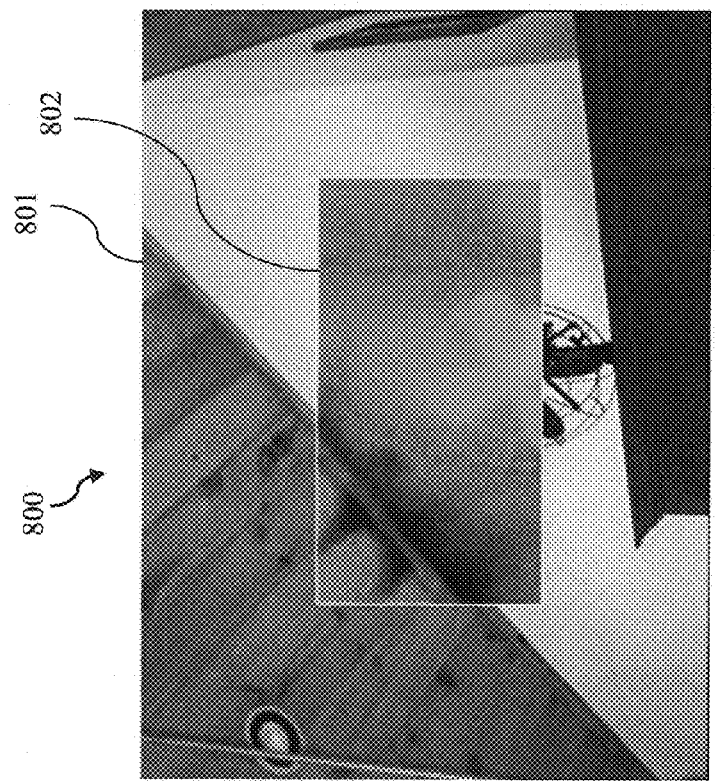

In examples illustrated in FIGS. 7a and 8a, the original combined image 700, 800 is a picture-in-picture image visually representing a first image information type in the area 701, 801 (e.g. in the form of VL image information) and visually representing a second image information type in the area 702, 802 (e.g. in the form of IR image information or fused IR/VL information). In FIGS. 7b, 7c and 8b, versions 750, 760, 850 of the images 700, 800 of FIGS. 7a and 8a are shown, further having transition areas with enhanced/smooth/gradual transitions according to embodiments of the invention. The image 760 of FIG. 7c comprises a transition area 704 wherein the first and the second image information types are mixed according to a mixing rule, as described in steps S208 above. The transition area 704 may, as illustrated in FIG. 7c, be determined as a set of pixels surrounding the border of the area 702. The determined set of pixels may then comprise only pixels from the area 701 representing the first image information type; only pixels from the area 702 representing the second image information type; or pixels from both areas 701 and 702, depending on how the selection rule is defined. Another way of describing it is that FIG. 7c illustrates a selected pixel set 704, wherein the selected pixels are a subset of the pixels representing the first type of image information and located within a certain number of pixels from the nearest pixel representing the second type of image information. Of course, the set of selected pixels may instead be a subset of the pixels representing the second type of image information and located within a certain number of pixels from the nearest pixel representing the first type of image information, or comprise neighboring subsets of pixels representing the first type of image information and pixels representing the second type of image information.

In examples illustrated in FIGS. 7b and 8b according to one or more embodiments, the original combined image 700, 800 is a picture-in-picture image visually representing a first image information type in the area 701 and visually representing a second image information type in the area 702, and the transition area of the resulting images 750, 850 is determined both dependent on pixel coordinates relating to the location of picture-in-picture area, whose outer border may e.g. form the inner border for the transition area 703 in FIG. 7b, and by a temperature threshold or interval that determines which pixels in the areas 701, 801 and 702, 802, respectively, are to be included in the transition area. In embodiments, the determined set of pixels may comprise only pixels from the area 701, 801 representing the first image information type; only pixels from the area 702, 802 representing the second image information type; or pixels from both areas 701, 801 and 702, 802, depending on how the selection rule is defined.

In FIGS. 7a to 7c, 8a and 8b the picture-in-picture area 702, 802 is rectangular and centered, but any shape and placement within the image 700, 800 is of course possible.

In embodiments wherein the location of the one or more picture-in-picture areas is not known, the determining a set of pixel coordinates further comprises identifying the location of the picture-in-picture area or the border between areas representing different types of image data, using detection methods known in the art. In an embodiment, this comprises edge detection in the combined image.

Figure 3:
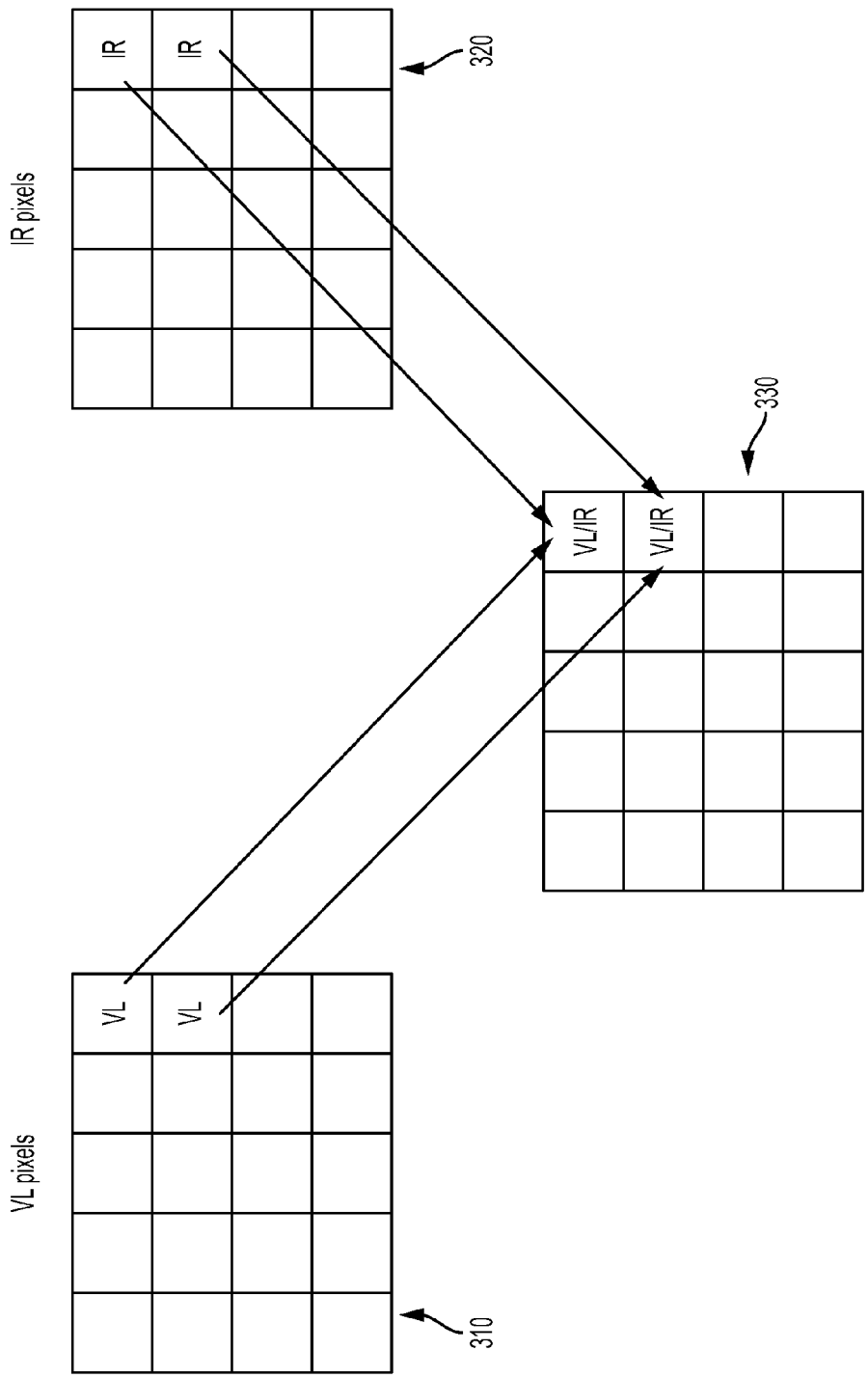
FIG. 3 shows an example of VL and IR pixel mixing according to embodiments.

Pixels in a third set of pixel coordinates (e.g., a third set of pixel coordinates 250 of FIGS. 2b and 2c) are combined according to their original coordinates in each image. This is illustrated in FIG. 3. In FIG. 3, an example is shown wherein the pixel values of a first image 310 are based in VL image information only and the pixel values of a second image 320 are based on IR image information only, whereby the pixels of the combined image 330 are represented as a mix of VL and IR image information. The example is selected as it is easy to illustrate and understand. As is readily apparent to a person skilled in the art and presented in embodiments herein, the pixel values of the images to be combined may be representations of IR information, VL information or a combination thereof. Suitable combinations are, as known to the skilled person, any combination of image information used in IR or thermal imaging that would help an observer interpret the imaged result, for example by showing some of the image content as IR information and remaining parts as blended IR/VL information, or some as VL information and remaining parts as blended IR/VL information. In the transitions between the different types of image information, the smooth transition according to embodiments of the invention may be applied.

In an embodiment, the mixing rule for obtaining mixed pixels includes using alpha blending. Generally, alpha blending is a process of combining a foreground color with a background color, thereby producing a new blended color. The components of the pixels in the third set of pixel coordinates 250 may for instance be represented using the RGB color space, or any other suitable color space. The use of different color spaces, or color models, for visual representation of pixel values as grey scale or color values is well known to the skilled person.

Relating to the mixing rule of Step S208, an example is shown in FIGS. 6a and 6b, wherein FIG. 6a is a graph 600 illustrating a percentage of image information type in a picture-in-picture image according to the prior art, without an enhanced transition, and FIG. 6b is a graph 620 illustrating a percentage of image information type in a picture-in-picture image with an enhanced transition according to an embodiment. From FIG. 6a it can be seen that the transition between the picture-in-picture area 610 and the remaining parts of the image is hard, going from 100% of the first type of image information in pixels comprised within the picture-in-picture area 610 to 100% of the second type of image information in the pixels not comprised in the area picture-in-picture 610. In graph 620 of FIG. 6b, the transition, or mixing, between the two types of image information is instead gradual over the transition area, as illustrated by the inclined line 630. This provides a smooth and visually enhanced image 620 compared to the image 600 that comprises only hard transitions. In FIG. 6b, the mixing rule comprises mixing the first and second type of image information according to a linear transition from 100% of the first image information type to 100% of the second image information type. In other words, pixels determined to belong to the transition area, according to the selection rule of step S207, are assigned a certain percentage of the first type of image information and a certain percentage of the second type of image information according to a linear function depending on the pixel coordinate and the distance from the pixel coordinate to the closest pixel coordinate outside the defined transition area comprising only the first type of image information and the closest pixel coordinate outside the defined transition area comprising only the second type of image information. The closer the pixel within the transition area for example is to a pixel representing 100% of the first type of image information, the higher percentage of the first type of image information it will be assigned. This linear transition is illustrated by line 630. Of course, any type of line or function, e.g. a non-linear function, Bezier curve or other function well known in the art may be used to achieve the smoothened transition between the two types of image information. In FIGS. 6c and 6d another example is shown as a graph 640 and an image 660, wherein the pixels in the area 670 outside the picture-in-picture area 610 are according to a mixing rule embodiment all assigned a pixel value comprising a combination of the first and second type of image information. In FIG. 6c, the pixels outside of the picture-in-picture area 610 are is as illustrated by the line 650 assigned the same percentage or mix of the first and the second image type representation. Of course, the line 650 could have any inclination and does not need to be a linear function. The example should be seen as illustrating that the mixing according to the mixing rule of step S208 does not have to go from 100% of the first type of image information to the 100% of the second type of image information.

The mixing rule used may take various forms according to embodiment and can be based on a linear function, a parametric curve (such as a Bezier curve), an exponential function, a logarithmic function, a logistic function and/or any other mathematical function known to a person skilled in the art. The mathematical functions are visualized when a blending of VL and IR or IR/VL pixels occur, representing different curves of transition depending on the mathematical function used. Different mathematical functions give different visual results. E.g., the choice of an exponential function has a growing steep curve which presents a rapid blending, rather than a linear function which has neutral acceleration curve and presents a steady blending transition between the IR and VL regions.

In embodiments, the user is enabled to select the type of mixing used, by interacting with the one or more input devices 3, e.g. by selecting an option from a list of one or more options presented to the user in a user interface on a display integrated in, connected to or communicatively coupled to the IR or thermography arrangement 1 or an external computing device. In embodiments, the processor 2 is configured to receive a signal from the one or more input devices 3, indicating a user input selection, and further to adapt the mixing according to the input selection. This is to give a user of the IR or thermography arrangement 1 an additional option to control the blending of VL and IR pixels.

FIGS. 2b and 2c illustrate further method embodiments for generating a combined image from a first image and a second image depicting the same or a substantially same part of an observed real world scene, using the same or a substantially same field of view, to obtain a combined image having an enhanced transition between image areas representing different types of image information. The selection rules and mixing rules described for FIG. 2a are also applicable to the embodiments of FIGS. 2b and 2c.

In FIG. 2b, unlike in the method of FIG. 2a, the starting point is two images that are combined into one image, the combined image then being enhanced to obtain a resulting image having an enhanced transition between different types of image information represented in the image.

The first image 201 comprises a visible representation of one of the following types of image information:
i) visible light (VL) image information;
ii) IR image information; or
iii) combined VL/IR image information.

The second image 202 comprises a visible representation of one of the types i), ii) or iii) of image information, different from the type of image information comprised in the first image. In other words, the first image 201 and the second image 202 do not comprise the same type (i, ii, iii) of image information.

In an embodiment, the first image comprises VL image information while the second image comprises IR image information. In another embodiment, the first image comprises VL image information while the second image comprises combined VL/IR image information. In a third embodiment, the first image comprises IR image information while the second image comprises combined VL/IR image information.

The method of FIG. 2b comprises the following steps:
In step S200: determining a first set of pixel coordinates 210 from said first image 201 dependent on a first selection rule 205.

In an embodiment shown in FIG. 4, the first selection rule comprises selecting pixel coordinates associated with temperatures below T1 and above T2. The amount of pixels in the resulting combined image that originate from the first image 201 is dependent on how T1 and T2 are set.

In step S220: determining a second set of pixel coordinates 230 from said second image 202 dependent on a second selection rule 225.

In embodiments, the second selection rule 225 comprises selecting pixels from said IR image representing a temperature below a maximum temperature threshold Tmax and a temperature above a minimum temperature threshold Tmin. The said minimum temperature threshold is a selection of a preset temperature Tmin or a preset temperature Tmin plus a configurable positive offset from Tmin. The said maximum temperature threshold is a selection of a preset temperature Tmax or a preset temperature Tmax minus a configurable negative offset from Tmax.

FIG. 4 shows, according to an embodiment, that the selected pixels comprised by the second selection rule 225 are IR pixels selected from an IR image, whereby pixels having coordinates associated with temperature values above Tmin and below Tmax will be selected from an IR image and represent IR image information in the resulting combined image. The amount of pixel coordinates in the resulting combined image that are represent the type of image information comprised in the second image, in the case of FIG. 4 representing IR image information, is dependent on how the preset thresholds Tmin and Tmax are set.

In step S240: determining a third set of pixel coordinates 250 from said first image 201 and said second image 202 dependent on a third selection rule 245.

In an embodiment, the pixel coordinates of the third set partly overlaps with the pixel coordinates of the first set and the pixel coordinates of the second set.

In an embodiment, the pixel coordinates selected according to the first, the second and the third selection rule are mutually exclusive. Furthermore, the pixel coordinates selected according to the three rules together comprise all pixel coordinates in the first (or second) image depicting of the real world scene.

FIG. 4 shows an embodiment wherein the selected pixels from the third selection rule represent a temperature greater than said first temperature threshold T1 and less than or equal to said minimum temperature threshold Tmin. FIG. 4 shows, according to an embodiment, that the third selection rule also comprises selecting pixels representing a temperature less than said second temperature threshold and greater than or equal to said maximum temperature threshold Tmax.

In step S280: generating a resulting combined image 290 by:
for each pixel in the first image 201 having pixel coordinates comprised in the first set of pixel coordinates 210, assigning the pixel value of said pixel in the first image 201 to the corresponding pixel of the combined image 290;
for each pixel in the second image 202 having pixel coordinates comprised in the second set of pixel coordinates 230, assigning the pixel value of said pixel in the second image 202 to the corresponding pixel of the combined image 290; and
for each pixel in the combined image 290 having pixel coordinates comprised in the third set of pixel coordinates 250, assigning pixel values based on a mixing rule 270 and pixel values of the corresponding pixels of the first and second images 201, 202.

In this step, the pixels of the three sets of pixel coordinates 210, 230, 250 are combined into one resulting combined image 290. After step S280, the pixels of the resulting, combined image 290 having coordinates comprised in the first set of pixel coordinates 210 have the same pixel values as the corresponding pixels (having the same coordinates) in the first image 201, the pixels of the resulting combined image 290 having coordinates comprised in the second set of pixel coordinates 230 have the same pixel values as the corresponding pixels (having the same coordinates) in the second image 202, and the pixels of the resulting combined image 290 having coordinates comprised in the third set of pixel coordinates 250 have the pixel values that have been assigned to the corresponding pixels (having the same coordinates) in the assigning of step S280.

In embodiments wherein the pixel coordinates of the third set partly overlaps with the pixel coordinates of the first set and the pixel coordinates of the second set, the pixels in the resulting combined image comprised in overlapping regions are assigned the pixel values that have been assigned to the corresponding pixels (having the same coordinates) of the third set.

In FIG. 2c, method embodiments similar to those of FIG. 2b are illustrated. The first and second images 201, 202 correspond to the first and second images 201, 202 described in connection with FIG. 2b. In FIG. 2c, steps S200 and S220, and the added step S255, are optional. Step S240 is performed according to the description of FIG. 2b.

If steps S200 and S220 are performed, the method further comprises:

In step S255: generating a combined image 203 by combining the pixels of the first set of pixel coordinates 210, having pixel values correlating to the pixel values of the corresponding pixels in the first image 201 and the pixels of the second set of pixel coordinates 230, having pixel values correlating to the pixel values of the corresponding pixels in the second image 202.

As a result, for example, the combined image 203 consists of pixels having pixel values corresponding to those with the same coordinates in the first image 201 and pixels having pixel values corresponding to those with the same coordinates in the second image 202.

In embodiments wherein steps S200, S220 and S255 are not performed, the combined image 203 is acquired before the start of the method.

The method of FIG. 2c further comprises:

In step S265: generating a resulting combined image 290 by, in the image 203, assigning pixel values to the pixels having coordinates comprised in the third set of pixel coordinates 250 dependent on a mixing rule 270.

In other words, in the method embodiments of FIG. 2c, the pixels that are determined to belong to the transition area are assigned new pixel values according to the determined mixing rule.

For the methods of FIGS. 2b and 2c, all the selection rules and mixing rules described in view of FIG. 2a may be applied.

In embodiments, the regulated thresholds or the selected surface area may be regulated by another input parameter than a temperature parameter of a scene, wherein the other input parameter comprises automatic object recognition of an object from a scene or manual input by a user interacting with the one or more input devices 3. In one embodiment, the other input parameter comprises following other input parameters for defining the surface area: a recognition of a center of the scene based on a calculation of geometric distances, a pattern recognition of scene based on e.g. size, shape, objects and/or colors of the scene, a manually drawn surface area using a touch sensitive screen based on input device parameters obtained through an indication from a user.

Temperature Thresholds

According to various embodiments, the user is able to control the enhancement or smoothing of transitions in a combined image through input of selection parameters, using one or more input device integrated in, connected to or communicatively coupled to the IR or thermography arrangement, or integrated in, connected to or communicatively coupled to the external processing device. The input may include a selection of the following:
marking and selection of an area in a combined image;
selection of one or more temperature thresholds or temperature intervals;
selection of span and/or level for display of the temperature related information of the combined image; and
adjustment of the mixing options in the mixing rule applied to a defined transition area, e.g. the size of a geometrically selected area; the temperatures on which a temperature threshold or interval selection of a transition area is based; color/intensity/grey scale settings for the display of the combined image and/or the processed combined image; and/or which amounts of the first and the second image information type that different parts of the transition area should be set to after mixing.

In one or more embodiments, the one or more temperature threshold value or interval is selected based in user input, the user input being received in the processor 2 via an input device 3 in response to a user interacting with the input device 3. Thereby, the user is directly enabled to adjust the visual representation of the resulting image by manipulating the enhanced/smooth/gradual transition between different parts of the image representing different types of image information in a combined image.

In one embodiment, one or more temperature threshold value or interval is set automatically according to settings of the IR or thermography arrangement 1. The settings may e.g. be based on selecting one or more temperature value or interval among those measured or calculated from an observed scene, or based on preset rules and logic.

According to an exemplary embodiment, an optional step for processing the resulting combined image comprises reducing noise and/or blur the IR image is performed through the use of a spatial low pass filter and/or a filter adapted to remove outliers/salt-and-pepper noise. Low pass filtering may be performed by placing a spatial core over each pixel of the image and calculating a new value for said pixel by using values in adjacent pixels and coefficients of said spatial core.

The purpose of the low pass filtering performed at the optional step is to smooth out unevenness in the IR image from noise present in the original IR image captured. Since sharp edges and noise visible in the original IR image are removed or at least diminished in the filtering process, the visibility in the resulting image is further improved through the filtering of the IR image and the risk of double edges showing up in a combined image where the IR image and the VL image are not aligned is reduced.

Processing of the IR image to reduce noise in and/or blur the IR image can be performed according to any method known to a skilled person in the art.

Contrast Enhancement

In cases of images with different resolution are to be combined or images generally of undesirable resolution there is a need to enhance its resolution with a method for contrast enhancement. A method to enhance the contrast of the resulting combined image objects described below.

The IR image and the VL image might be obtained with different resolution, i.e. different number of sensor elements of the imaging systems. In order to enable pixel wise operation on the IR and VL image they need to be re-sampled to a common resolution. Re-sampling can be performed according to any method known to a skilled person in the art.

In one or more embodiments an IR image and a VL image is contrast enhanced by combining an aligned IR image with high spatial frequency content of an aligned VL image to yield a contrast enhanced combined image. The combination is performed through superimposition of a high spatial frequency content of the VL image and the IR image, or alternatively superimposing the IR image on the high spatial frequency content of the VL image. As a result, contrasts from the VL image can be inserted into an IR image showing temperature variations, thereby combining the advantages of the two image types without losing clarity and interpretability of the resulting contrast enhanced combined image.

The contrast enhancing methods described herein may be applied to the resulting combined image, or to an IR or combined IR/VL image that is used as the first and second image and input into the method embodiments.

In embodiments, the first and/or second image input into the method embodiments herein may have been preprocessed using for example a selection of dynamic compression, false coloring, histogram equalization, smoothing and/or low pass filtering.

An exemplary method for generating a contrast enhanced combined image comprises the following:

In an exemplary embodiment, the sensor elements of the IR imaging system and the sensor elements of the VL image system are substantially the same, e.g. have substantially the same resolution.

In an exemplary embodiment, the IR image may be captured with a very low resolution IR imaging device, the resolution for instance being as low as 64×64 or 32×32 pixels, but many other resolutions are equally applicable, as is readily understood by a person skilled in the art. The inventor has found that if edge and contour (high spatial frequency) information is added to the combined image from the VL image, the use of a very low resolution IR image will still render a combined image where the user can clearly distinguish the depicted objects and the temperature or other IR information related to them.

In an exemplary embodiment, parallax error comprises parallax distance error between the optical axes that generally arises due to differences in placement of the sensors of the imaging systems for capturing said IR image and said VL image, the parallax pointing error angle created between these axes due to mechanical tolerances that generally prevents them being mounted exactly parallel and the parallax rotation error due to mechanical tolerances that generally prevents them being mounted exactly with the same rotation around the optical axis of the IR and VL image systems.

In one exemplary embodiment, the resolution value represents the number of pixels in a row and the number of pixels in a column of a captured image.

In one exemplary embodiment, the resolutions of the imaging systems are predetermined.

Determining a resolution value of the IR imaging system and a resolution value of VL imaging system, wherein the resolution value of the IR imaging system corresponds to the resolution of the captured IR image and the resolution value of VL imaging system corresponds to the resolution of the captured VL image can be performed according to any method known to a skilled person in the art.

If it is determined that the VL image resolution value and the IR image resolution value are not substantially the same the method may further involve the optional step of re-sampling at least one of the received images so that the resulting VL image resolution value and the resulting IR image resolution value, obtained after re-sampling, are substantially the same.

In one exemplary embodiment, re-sampling comprises up-sampling of the resolution of the IR image to the resolution of the VL image.

In one exemplary embodiment, re-sampling comprises up-sampling of the resolution of the VL image to the resolution of the IR image.

In one exemplary embodiment, re-sampling comprises down-sampling of the resolution of the IR image to the resolution of the VL image.

In one exemplary embodiment, re-sampling comprises down-sampling of the resolution of the VL image to the resolution of the IR image.

In one exemplary embodiment, re-sampling comprises re-sampling of the resolution of the IR image and the resolution of the VL image to an intermediate resolution different from the captured IR image resolution and the captured VL image resolution.

In one exemplary embodiment, the intermediate resolution is determined based on the resolution of a display unit of the IR or thermography arrangement or imaging device.

According to an exemplary embodiment, the method is performed for a portion of the IR image, a corresponding portion of the VL image and a portion of a mixed VL/IR image. According to an embodiment, the corresponding portion of the VL image is the portion that depicts the same part of the scene as the portion of the IR image. In this embodiment, high spatial frequency content is extracted from the portion of the VL image, the portion of the IR image, the portion of the mixed VL/IR image and combined with the extracted high spatial frequency content of the portion of the VL image, to generate a combined image, wherein the contrast and/or resolution in the portion of the IR image is increased compared to the contrast of the originally captured IR image.

According to different embodiments, said portion of the IR image may be the entire IR image or a sub portion of the entire IR image and said corresponding portion of the VL image may be the entire VL image or a sub portion of the entire VL image. In other words, according to an embodiment the portions are the entire IR image and a corresponding portion of the VL image that may be the entire VL image or a subpart of the VL image if the respective IR and visual imaging systems have different fields of view.

According to an exemplary embodiment, extracting the high spatial frequency content of the VL image is performed by high pass filtering the VL image using a spatial filter.

According to an exemplary embodiment, extracting the high spatial frequency content of the VL image is performed by extracting the difference (commonly referred to as a difference image) between two images depicting the same scene, where a first image is captured at one time instance and a second image is captured at a second time instance, preferably close in time to the first time instance. The two images may typically be two consecutive image frames in an image frame sequence. High spatial frequency content, representing edges and contours of the objects in the scene, will appear in the difference image unless the imaged scene is perfectly unchanged from the first time instance to the second, and the imaging sensor has been kept perfectly still. The scene may for example have changed from one frame to the next due to changes in light in the imaged scene or movements of depicted objects. Also, in almost every case the imaging device or thermography system will not have been kept perfectly still.

A high pass filtering is performed for the purpose of extracting high spatial frequency content in the image, in other words locating contrast areas, i.e. areas where values of adjacent pixels display large differences, such as sharp edges. A resulting high pass filtered image can be achieved by subtracting a low pass filtered image from the original image, calculated pixel by pixel.

Processing the VL image by extracting the high spatial frequency content of the VL image can be performed according to any method known to a skilled person in the art In one exemplary embodiment, combining the extracted high spatial frequency content of the captured VL image and the optionally processed IR image to a combined image comprises using only the luminance component Y from the processed VL image.

In one exemplary embodiment, combining the extracted high spatial frequency content of the captured VL image and the optionally processed IR image to a combined image comprises combining the luminance component of the extracted high spatial frequency content of the captured VL image with the luminance component of the optionally processed IR image. As a result, the colors or greyscale of the IR image are not altered and the properties of the original IR palette maintained, while at the same time adding the desired contrasts to the combined image. To maintain the IR palette through all stages of processing and display is beneficial, since the radiometry or other relevant IR information may be kept throughout the process and the interpretation of the combined image may thereby be facilitated for the user.

In one exemplary embodiment, combining the extracted high spatial frequency content of the captured VL image and the optionally processed IR image to a combined image comprises combining the luminance component of the VL image with the luminance component of the IR image using a factor alpha to determine the balance between the luminance components of the two images when adding the luminance components. This factor alpha can be determined by the imaging device or imaging system itself, using suitable parameters for determining the level of contour needed from the VL image to create a satisfactory image, but can also be decided by a user by giving an input to the imaging device or imaging system. The factor can also be altered at a later stage, such as when images are stored in the system or in a PC or the like and can be adjusted to suit any demands from the user.

In one exemplary embodiment, combining the extracted high spatial frequency content of the captured VL image and the optionally processed IR image to a combined image comprises using a palette to map colors to the temperature values of the IR image, for instance according to the YCbCr family of color spaces, where the Y component (i.e. the palette luminance component) may be chosen as a constant over the entire palette. In one example, the Y component may be selected to be 0.5 times the maximum luminance of the combined image, the VL image or the IR image. As a result, when combining the IR image according to the chosen palette with the VL image, the Y component of the processed VL image can be added to the processed IR image and yield the desired contrast without the colors of the processed IR image being altered. The significance of a particular nuance of color is thereby maintained during the processing of the original IR image.

When calculating the color components, the following equations can be used to determine the components Y, Cr and Cb for the combined image with the Y component from the processed, e.g. high pass filtered, VL image and the Cr and Cb components from the IR image $hp\_y\_vis = \text{highpass}(y\_vis)$ $(y\_ir, cr\_ir, cb\_ir) = \text{colored}(\text{lowpass}(ir\_signal\_linear))$ which in another notation would be written as:

$hp_{y_{vis}} = \text{highpass}(y_{vis})$ $(y_{ir}, cr_{ir}, cb_{ir}) = \text{colored}(\text{lowpass}(ir_{signal\ linear}))$ Other color spaces than YCbCr can, of course, also be used with embodiments of the present disclosure. The use of different color spaces, such as RGB, YCbCr, HSV, CIE 1931 XYZ or CIELab for instance, as well as transformation between color spaces is well known to a person skilled in the art. For instance, when using the RGB color model, the luminance can be calculated as the mean of all color components, and by transforming equations calculating a luminance from one color space to another, a new expression for determining a luminance will be determined for each color space.

According to an exemplary embodiment, the high resolution noise is high resolution temporal noise.

High resolution noise may be added to the combined image in order to render the resulting image more clearly to the viewer and to decrease the impression of smudges or the like that may be present due to noise in the original IR image that has been preserved during the optional low pass filtering of said IR image.

Aligning

The capturing of a IR image and capturing of a visual light (VL) image is generally performed by different imaging systems of the imaging device mounted in such a way that the offset, direction and rotation around the optical axes differ. The optical axes between the imaging systems may be at a distance from each other and an optical phenomenon known as parallax distance error will arise. The optical axes between the imaging systems may be oriented at an angle in relation to each other and an optical phenomenon known as parallax pointing error will arise. The rotation of the imaging systems around their corresponding optical axes and an optical phenomenon known as parallax rotation error will arise. Due to these parallax errors the captured view of the scene, commonly referred to as the field of view (FOV), might differ between the IR imaging system and the VL imaging system.

Furthermore, the imaging systems typically have different optical systems with different properties, such as different magnification, again the captured view of the scene/FOV might differ. The IR image and the VL image might be obtained with different optical systems with different optical properties, such as magnification, resulting in different sizes of the FOV captured by the IR sensor and the VL sensor.

If a captured IR and a captured VL image are to be combined, the images must therefore first be adapted so that the adapted IR image and the adapted VL image represent the same part of the scene, in other words compensating for the different parallax errors and FOV size. This processing step is referred to as registration of, or alignment of, the images.

In embodiments, the images may be captured at the same time or with as little time difference as possible, since this will decrease the risk for alignment differences due to movements of an imaging device unit capturing the visual and IR images. As is readily apparent to a person skilled in the art, images captured at time instances further apart may also be used.

Registration or alignment can be performed according to any method known to a skilled person in the art.

Further Embodiments

In aspects of the invention there is provided a non-transitory machine-readable medium storing a plurality of machine-readable instructions which, when executed by one or more processors of a device, cause the device to perform a method for generating a combined image having an enhanced transition between image areas of a combined image, the image areas each representing a different type of image information, the method comprising:

determining a set of pixel coordinates based on a selection rule, wherein the set of pixel coordinates partly overlaps at least one area in the combined image where pixel values represent image information according to a first type of image information, and/or wherein the set of coordinates partly overlaps at least another area in the combined image wherein pixel values represent image information according to a second type of image information; and generating the enhanced combined image by assigning pixel values to pixels having coordinates comprised in the determined set of pixel coordinates, based on a mixing rule and pixel values of the corresponding coordinates of the combined image, wherein the combined image comprises image information from a first image and a second image depicting a substantially same part of an observed real world scene using a substantially same field of view, wherein the first image comprises a visible representation of the first type of image information comprising one of the following types of image information:

i) visible light (VL) image information,
ii) infrared (IR) image information, or
iii) combined VL/IR image information, wherein the second image comprises a visible representation of the second type of image information comprising one of the types i), ii) or iii) of image information, and wherein the first image and the second image do not comprise the same type of image information.

In an embodiment, the determined set of pixel coordinates comprise or are located along the border between pixels having values representing image information according to the first type of image information and pixels having values representing image information according to the second type of image information.

In an embodiment, the selection rule comprises temperature thresholding.

In an embodiment, the mixing rule comprises assigning a pixel value to each pixel comprised in the determined set of pixel coordinates based on the pixel values of the pixels having corresponding coordinates in the first and second image, and on a mathematical function for calculating a percentage of the pixel values from the first and second image that is to be assigned to said pixel comprised in the determined set of pixel coordinates.

In an embodiment, the mathematical function is a selection of:

a linear function;
a parametric curve;
an exponential function;
a logarithmic function; and/or
a logistic function.

In an embodiment, the selection rule comprises selecting pixel coordinates within a selected area.

In an embodiment, the selecting pixel coordinates is based on settings of an IR or thermography arrangement.

In an embodiment, the selecting pixel coordinates is responsive to an input selection received from an input device of an IR or thermography arrangement.

In embodiments, the machine-readable medium comprising a plurality of machine-readable instructions which when executed by one or more processors of a computing device are further configured to cause the device to perform any or all of the method steps or functions described herein.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

The invention claimed is:

1. A method comprising:
    receiving first and second images depicting a scene and having substantially the same field of view, the first and second images comprising visible light (VL) image information and infrared (IR) image information, respectively;
    determining a transition area for an enhanced combined image based on a selection rule, wherein the transition area at least partly overlaps corresponding first and second sets of pixel coordinates of the first and second images, wherein the transition area is less than an entirety of the enhanced combined image; and
    generating the enhanced combined image by:
    assigning pixel values to the transition area based on a temperature-dependent mixing rule applied to pixel values of the corresponding pixel coordinates of the first and second images to provide an enhanced transition between the VL and IR image information of the scene, and
    assigning pixel values to pixel coordinates of the enhanced combined image bordering first and second sides of the transition area based on pixel values of the corresponding first or second set of pixel coordinates of the first image or the second image, respectively.

2. The method of claim 1, further comprising:
    generating a preliminary combined image by combining the pixel values of the first and second sets of pixel coordinates of the first and second images; and
    wherein the generating the enhanced combined image is performed using the pixel values from the preliminary combined image.

3. The method of claim 1, wherein:
    the selection rule is a third selection rule; and
    the method further comprises determining the first and second sets of pixel coordinates of the first and second images based on first and second selection rules, respectively.

4. The method of claim 1, wherein the selection rule comprises temperature thresholding.

5. The method of claim 1, wherein the mixing rule comprises a mathematical function for calculating percentages of the pixel values of the corresponding pixel coordinates of the first and second images.

6. The method of claim 5, wherein the mathematical function is a selection of:
    a linear function;
    a parametric curve;
    an exponential function;
    a logarithmic function; and/or
    a logistic function.

7. The method of claim 1, wherein the selection rule comprises selecting the set of pixel coordinates within a selected area.

8. The method of claim 7, wherein the selecting pixel coordinates is based on settings of an IR or thermography arrangement.

9. The method of claim 7, wherein the selecting pixel coordinates is responsive to an input selection received from an input device of an IR or thermography arrangement.

10. An infrared (IR) or thermography arrangement comprising:
    an IR imaging system configured to capture an IR image of a scene;
    a visible light (VL) imaging system configured to capture a VL image of the scene having substantially the same field of view as the IR image; and
    a processor arranged to:
    determine a transition area for an enhanced combined image based on a selection rule, wherein the transition area at least partly overlaps corresponding first and second sets of pixel coordinates of the IR and VL images, wherein the transition area is less than an entirety of the enhanced combined image, and
    generate the enhanced combined image by:
        assigning pixel values to the transition area based on a temperature-dependent mixing rule applied to pixel values of the corresponding pixel coordinates of the IR and VL images to provide an enhanced transition between the VL and IR image information of the scene, and
        assigning pixel values to pixel coordinates of the enhanced combined image bordering first and second sides of the transition area based on pixel values of the corresponding first or second set of pixel coordinates of the IR image or the VL image, respectively.

11. The arrangement of claim 10, wherein the processor is arranged to:
    generate a preliminary combined image by combining the pixel values of the first and second sets of pixel coordinates of the IR and VL images; and
    wherein the enhanced combined image is generated using the pixel values from the preliminary combined image.

12. The arrangement of claim 10 wherein:
    the selection rule is a third selection rule; and
    the processor is further configured to determine the first and second sets of pixel coordinates of the IR and VL images based on first and second selection rules, respectively.

13. A non-transitory machine-readable medium storing a plurality of machine-readable instructions which, when executed by one or more processors of a device, cause the device to perform a method comprising:
    receiving first and second images depicting a scene and having substantially the same field of view, the first and second images comprising visible light (VL) image information and infrared (IR) image information, respectively;
    determining a transition area for an enhanced combined image based on a selection rule, wherein the transition area at least partly overlaps corresponding first and second sets of pixel coordinates of the first and second images, wherein the transition area is less than an entirety of the enhanced combined image; and generating the enhanced combined image by:

assigning pixel values to the transition area based on a temperature-dependent mixing rule applied to pixel values of the corresponding pixel coordinates of the first and second images to provide an enhanced transition between the VL and IR image information of the scene, and assigning pixel values to pixel coordinates of the enhanced combined image bordering first and second sides of the transition area based on pixel values of the corresponding first or second set of pixel coordinates of the first image or the second image, respectively.

14. The non-transitory machine-readable medium of claim 13, wherein the method further comprises:

generating a preliminary combined image by combining the pixel values of the first and second sets of pixel coordinates of the first and second images; and wherein the generating the enhanced combined image is performed using the pixel values from the preliminary combined image.

15. The non-transitory machine-readable medium of claim 13, wherein the selection rule comprises temperature thresholding.

16. The non-transitory machine-readable medium of claim 13, wherein the mixing rule comprises a mathematical function for calculating percentages of the pixel values of the corresponding pixel coordinates of the first and second images.

17. The non-transitory machine-readable medium of claim 16, wherein the mathematical function is a selection of:

a linear function;

a parametric curve;

an exponential function;

a logarithmic function; and/or a logistic function.

18. The non-transitory machine-readable medium of claim 13, wherein the selection rule comprises selecting the set of pixel coordinates within a selected area.

* * * * *